(12) United States Patent
Buelau et al.

(10) Patent No.: US 9,581,425 B2
(45) Date of Patent: Feb. 28, 2017

(54) SENSOR FOR INDICATING A POSITION OR A CHANGE IN POSITION OF A COUPLING ELEMENT AND METHOD FOR OPERATING THE SENSOR

(71) Applicant: Hahn-Schickard-Gesellschaft für angewandte Forschung e.V., Villingen-Schwenningen (DE)

(72) Inventors: André Buelau, Stuttgart (DE); Karl-Peter Fritz, Holzgerlingen (DE); Frank Wolter, Leonberg (DE)

(73) Assignee: Hahn-Schickard-Gesellschaft für angewandte Forschung e.V., Villingen-Schwenningen (DE)

( * ) Notice: Subject to any disclaimer, the term of this patent is extended or adjusted under 35 U.S.C. 154(b) by 280 days.

(21) Appl. No.: 14/449,745

(22) Filed: Aug. 1, 2014

(65) Prior Publication Data
US 2015/0035519 A1 Feb. 5, 2015

(30) Foreign Application Priority Data

Aug. 2, 2013 (EP) ..................................... 13179115
Nov. 18, 2013 (DE) ......................... 10 2013 019 168

(51) Int. Cl.
*G01B 7/00* (2006.01)
*G01B 7/14* (2006.01)
(Continued)

(52) U.S. Cl.
CPC .............. *G01B 7/003* (2013.01); *G01B 7/14* (2013.01); *G01D 5/2291* (2013.01); *G01D 11/30* (2013.01); *G01B 2210/60* (2013.01)

(58) Field of Classification Search
CPC .................................... G01B 7/00; G01B 7/14
(Continued)

(56) References Cited

U.S. PATENT DOCUMENTS 4,847,548 A 7/1989 Lafler
6,552,666 B1 4/2003 Goto
(Continued)

FOREIGN PATENT DOCUMENTS

DE 10047939 C2 5/2002
DE 102012010014 B3 9/2013
(Continued)

OTHER PUBLICATIONS

Pei, Precision LVDT Signal Conditioning Using Direct RMS to DC Conversion—Design Note 362, Linear Technology Corporation, 2005, 2 pages.
(Continued)

*Primary Examiner* — Jermele M Hollington
*Assistant Examiner* — Zannatul Ferdous
(74) *Attorney, Agent, or Firm* — Patterson Pedersen Thuente, P.A.

(57) ABSTRACT

Sensor having a primary coil, two secondary coils as well as an evaluator. An excitation signal may be applied to the primary coil. An output signal depending on a position of a coupling element may be induced in each secondary coil. An evaluator is configured to evaluate the output signals in order to evaluate a phase offset between the output signals. Further, the evaluator is configured to provide a sensor output signal indicating the position or change in position of the coupling element.

19 Claims, 25 Drawing Sheets

(51) Int. Cl.
*G01D 5/22* (2006.01)
*G01D 11/30* (2006.01)

(58) Field of Classification Search
USPC .................................................. 324/207.18
See application file for complete search history.

(56) References Cited

U.S. PATENT DOCUMENTS

| | | | | |
|---|---|---|---|---|
| 8,542,008 | B2* | 9/2013 | Nakano | G01D 5/2291 324/207.18 |
| 2005/0231194 | A1* | 10/2005 | Baldi | G01D 5/2291 324/207.18 |
| 2009/0224750 | A1* | 9/2009 | Hosek | G01B 7/003 324/207.13 |
| 2013/0057263 | A1* | 3/2013 | Hosek | G01D 5/2266 324/207.18 |

FOREIGN PATENT DOCUMENTS

| | | |
|---|---|---|
| EP | 0 446 969 A2 | 9/1991 |
| EP | 1 054 238 A2 | 11/2000 |
| EP | 1 164 358 A1 | 12/2001 |

OTHER PUBLICATIONS

Analog Devices: Universal LVDT Signal Conditioner AD 598, Norwood, 1995, 16 pages.
Analog Devices: Universal LVDT Signal Conditioner AD 698, Norwood, 1995, 12 pages.
German Office Action from German Application No. 10 2014 019 168.8 dated Nov. 18, 2013, 5 pages.
European Search Report, Application No. 14179527.8, dated Feb. 5, 2015, 5 pages.

* cited by examiner

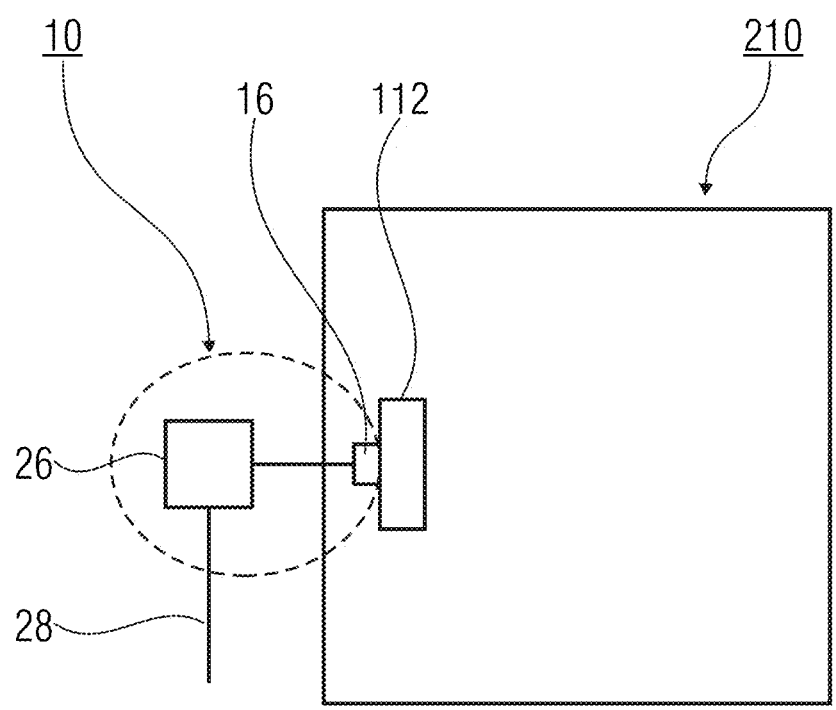

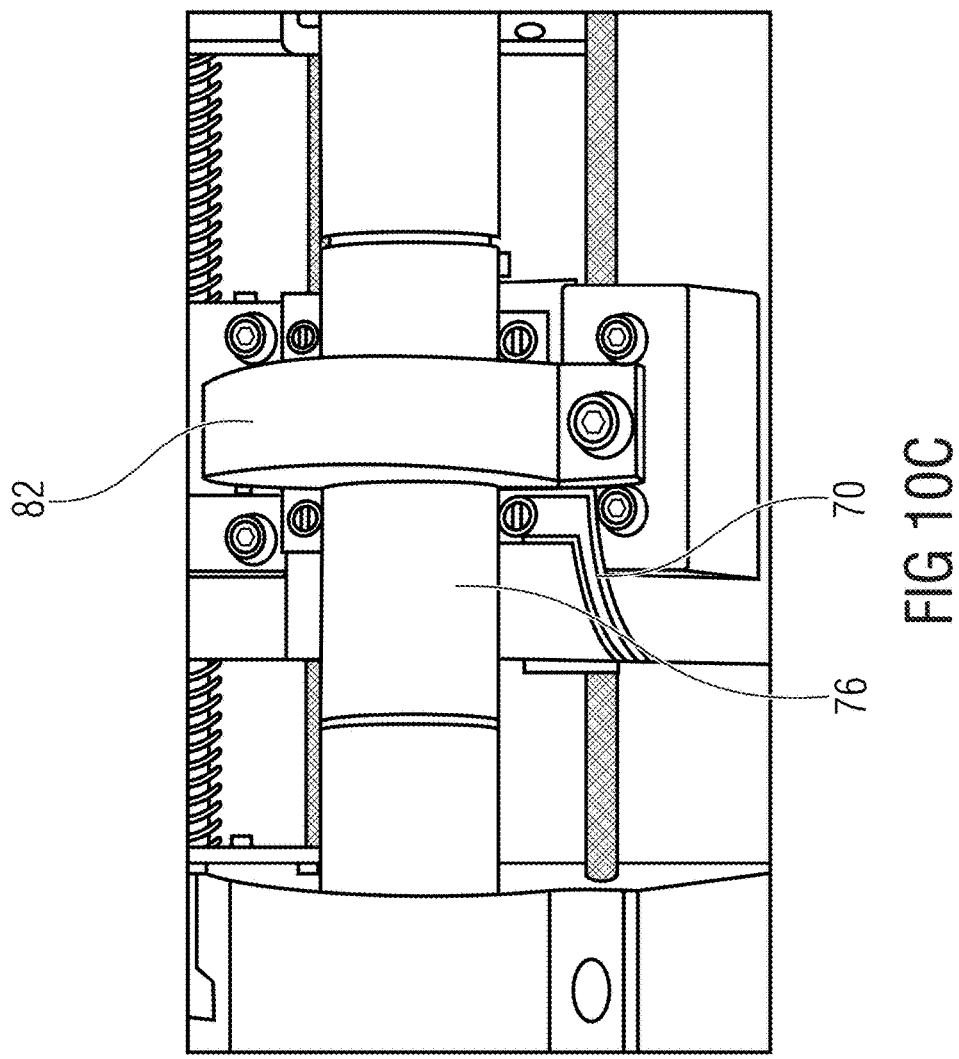

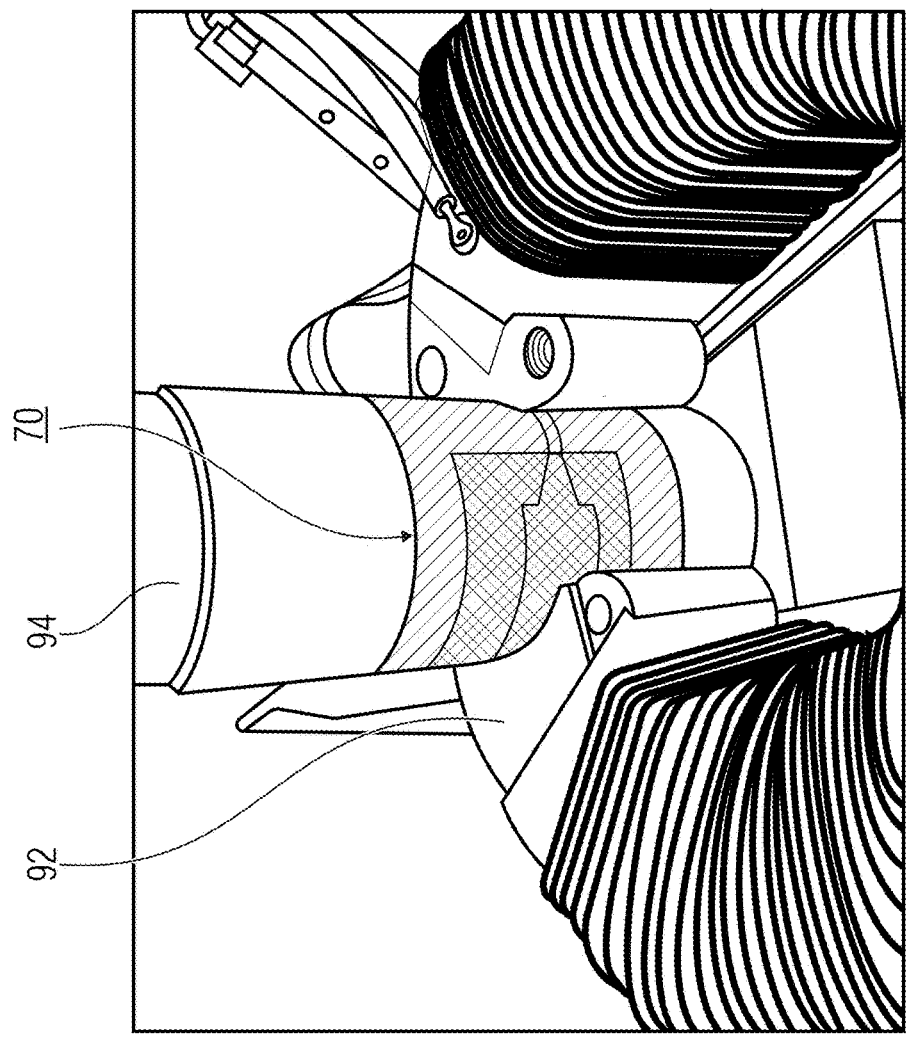

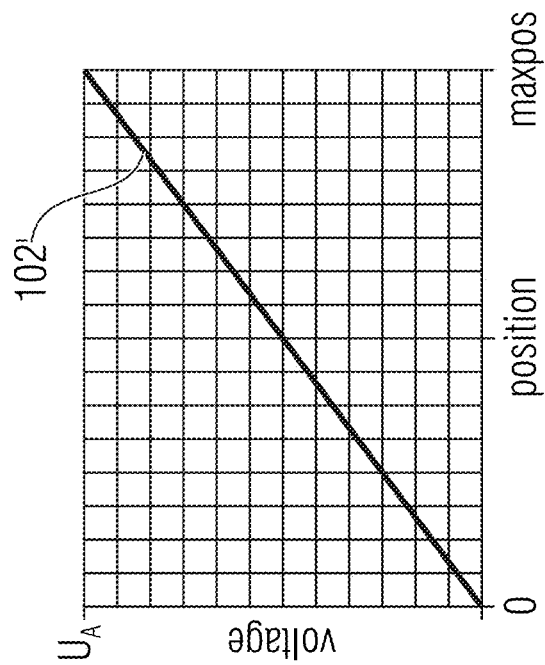
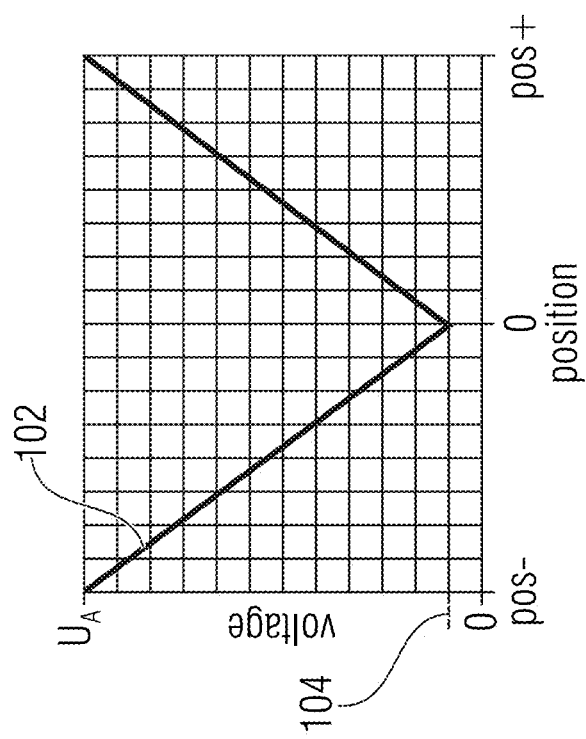
FIG 18B
FIG 18A

SENSOR FOR INDICATING A POSITION OR A CHANGE IN POSITION OF A COUPLING ELEMENT AND METHOD FOR OPERATING THE SENSOR

RELATED APPLICATIONS

This application claims priority from European Application No. 13179115.4, filed Aug. 2, 2013, and from German Application No. 10 2013 019 168.8, filed Nov. 18, 2013, which are both incorporated herein by reference in their entirety.

TECHNICAL FIELD

Embodiments relate generally to a sensor comprising a primary coil and two secondary coils, the output signals of which depend on a position of a coupling element. Other embodiments relate generally to methods for operating such sensors.

BACKGROUND OF THE INVENTION

The functional principle of inductive sensors operating in accordance with the linear variable differential transformer (LVDT) principle is based on coupling between a primary coil and two secondary coils by means of a coupling element. Shifting the coupling element has an influence on the voltages induced in the secondary coils so that drawing conclusions as to the position of the coupling element is possible using the voltages at the secondary coils.

The primary coil here is driven by an excitation signal or primary signal having an excitation frequency. The signal induced may be tapped at both secondary coils. With a symmetrical arrangement of the primary and secondary coils, the secondary signal induced by the primary signal in both secondary coils may be of equal quantity, when there is no coupling element. When there is a coupling element, there is a position thereof where coupling between the primary coil and the two secondary coils is equal such that the two secondary signals are also equal. When shifting the coupling element from said position, the secondary signals change reversely to each other such that a difference signal, which is dependent on the shift, may be achieved. Using so-called amplitude modulation methods, such as, for example, full-wave rectification, separate full-wave rectification including difference formation or synchronous demodulation, the difference signal may be evaluated.

With full-wave rectification, as may exemplarily take place in LVDT positional sensors by the ASM Automation Sensorik Messtechnik GmbH company, the two secondary coils are connected in phase opposition. The demodulated output signal may exhibit a typical V-shape, as is exemplarily illustrated in FIG. 18a. With a shifted coupling element, an amplitude in the output voltage may hint at two positions different from each other. In other words, full-wave rectification induces a problem of lacking unambiguity of the measuring signal. Without further auxiliary measures or further evaluations, it may be impossible to recognize whether the coupling element is on one or the other side of the zero position. Furthermore, the demodulated output signal is originally non-linear and may exhibit an offset which may result in the sensor signal also to comprise a value un-equaling zero in the symmetry position of the coupling element. In accordance with literature, the reason for this is, among other things, flow losses in the LVDT.

A separate full-wave rectification may exemplarily be performed in order to make the measuring signal unambiguous, wherein at first each of the secondary signals is demodulated separately and subsequently a difference is calculated such that the result is an unambiguous characteristic curve, as is exemplarily illustrated in FIG. 18b. Alternatively, full-wave rectification may be combined with phase detection such that a case-by-case analysis for the left and right branches of the V-shaped sensor signal curve is possible, as is exemplarily illustrated in FIG. 18c.

Both full-wave rectification and separate full-wave rectification and synchronous demodulation, as may exemplarily be performed in accordance with the application document SPRA 946 by the Texas Instruments company, result in additional circuit complexity which may necessitate expensive electronics.

Evaluating the signal amplitudes may also take place using a route mean square-to-direct current (RMS-to-DC) conversion, as is exemplarily described in the Design Note 362 by the Linear Technology company.

Integrated devices which combine several of these functions are, for example, the devices AD598 or AD698 by the Analog Devices company.

When evaluating the sensor signals, digitalization of the signals at the secondary coils may exemplarily be performed by an analog-to-digital converter (ADC).

The amplitude response of LVDT sensors may exhibit strong distortions when there are external magnetic fields or ferromagnetic material, as is exemplarily illustrated in FIGS. 21a to 21d. The result is that sensors operating in accordance with the LVDT principle may be unsuitable in many measuring arrangements where, for example, the sensor is to be accommodated in a metal casing or where there are strong magnetic fields, such as, for example, in electric motors.

Consequently, a device and a method for being able to measure a position of an element unambiguously and independently of external magnetic fields would be desirable.

The object underlying the present invention is providing sensors and methods for operating same which exhibit reduced space requirements and provide a more robust and more reliable detection of positions of movable objects.

SUMMARY OF THE INVENTION

According to an embodiment, a sensor may have: a primary coil; two secondary coils; wherein an excitation signal may be applied to the primary coil and an output signal depending on a position of a coupling element may be induced in each secondary coil; and an evaluating means for evaluating the output signals of the secondary coils, wherein the evaluating means is configured to evaluate a phase offset between the output signals, and to provide a sensor output signal proportional to the phase offset indicating the position or a change in position of the coupling element.

According to another embodiment, a device may have a sensor as mentioned above and further a movable element connected to the coupling element such that a position of the coupling element is influenced by a position of the movable element.

According to another embodiment, a flexible circuit for a sensor may have: a substrate; a primary coil having primary coil leads; two secondary coils having secondary coil leads; wherein the primary coil and the two secondary coils are planar coils on the substrate; wherein the two secondary coils are arranged next to each other; wherein the primary coil is arranged with respect to the two secondary coils such that turns of the primary coil enclose turns of the secondary coils; and wherein the primary coil leads and the secondary coils leads are arranged on an elongate substrate part, wherein the elongate substrate part is integrally implemented with a coil substrate part on which the two secondary coils and the primary coil are arranged.

According to another embodiment, a method for operating a sensor having a primary coil, two secondary coils and a coupling element may have the steps of: applying an excitation signal to the primary coil and inducing an output signal depending on a position of the coupling element in each secondary coil; and evaluating the output signals of the secondary coils based on a phase offset between the output signals, and providing a sensor output signal indicating the position or a change in position of the coupling element.

Another embodiment may have a computer program having a program code for performing the above method when the program runs on a computer.

The central idea of the present invention is having recognized that a position or a change in position of the coupling element may be obtained based on a phase offset between the output signals of a first secondary coil and second secondary coil.

An embodiment of the present invention shows a sensor comprising a primary coil and two secondary coils. An excitation signal may be applied to the primary coil. An output signal depending on a position of the coupling element may be induced in each secondary coil. An evaluating means of the embodiment is configured to evaluate the output signals of the secondary coils. Evaluating includes evaluating a phase offset between the output signals such that a sensor output signal of the sensor indicates the position or a change in position of the coupling element based on the phase offset.

An advantage of this embodiment is that a phase offset between the output signals of the secondary coils may be unambiguous and/or robust relative to external interfering effects, such as, for example, magnetic fields, and that a reliable operation of the sensor is also allowed in environments with strong external magnetic fields.

Another embodiment of the present invention shows a device comprising a sensor having a primary coil, two secondary coils and an evaluating means for evaluating the output signals and for providing the phase offset between the output signals. The coupling element is connected to a movable element of the device such that operating the sensor allows determining the position or determining a change in position of the movable element.

Another embodiment of the present invention includes a method for operating an inventive sensor. The method includes applying an excitation signal to the primary coil and inducing an output signal depending on a position of the coupling element in each secondary coil. In addition, the method includes evaluating the output signals of the secondary coils based on a phase offset between the output signals, and providing a sensor output signal indicating the position or a change in position of the coupling element.

BRIEF DESCRIPTION OF THE DRAWINGS

Embodiments of the present invention will be detailed subsequently referring to the appended drawings, in which:

FIG. 9 is a schematic block circuit diagram of a device comprising a movable element which is connected to the coupling element of a sensor;

FIG. 10c is a detailed view of the portion of the setup of FIG. 10b in which the pump casing is encased by the support member;

FIG. 11 shows the planar coil arrangement in direct proximity to the electromagnetic drive;

FIG. 13 shows a schematic graph having a phase response and an amplitude response between the two secondary coils, as may exemplarily be detected using a setup of FIG. 10a;

FIG. 18a is an exemplary and idealized illustration of a characteristic curve of a classical LVDT including signal amplitude evaluation with full-wave rectification;

FIG. 18b shows one potential corrective measure for ambiguity of FIG. 18a using an idealized characteristic curve, as may exemplarily be obtained with separate full-wave rectification for amplitude evaluation;

FIG. 21c shows an exemplary measuring result in which the interfering body is de-adjusted by 0.2 mm relative to FIG. 21a; and FIG. 21d shows an exemplary measuring result in which the interfering body is de-adjusted by 0.3 mm compared to FIG. 21a.

DETAILED DESCRIPTION OF THE DRAWINGS

Figure 1:
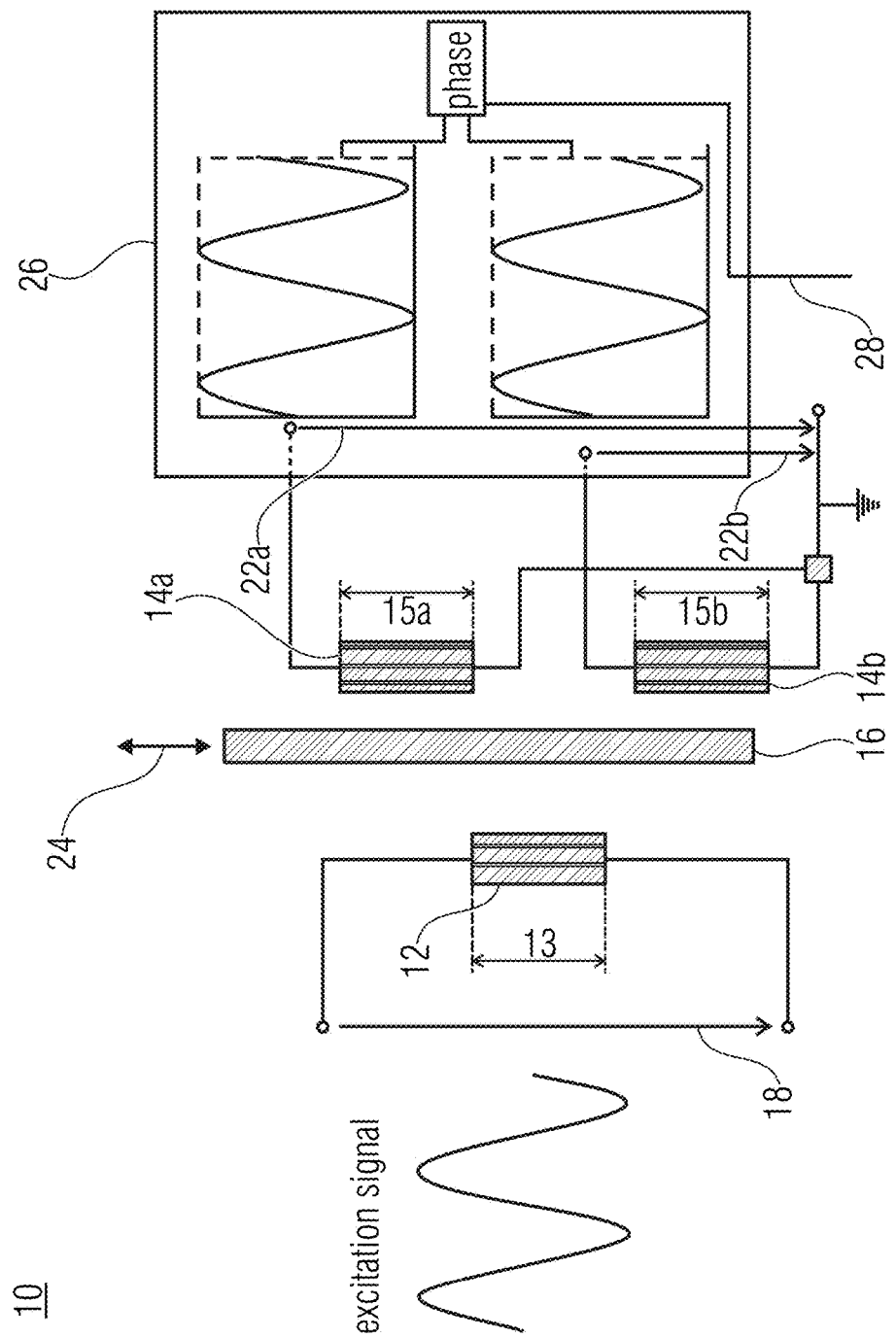
FIG. 1 is a schematic block circuit diagram of a sensor comprising a primary coil and two secondary coils.

Before subsequently discussing embodiments of the present invention in greater detail making reference to the figures, it is pointed out that identical elements, objects and/or structures or those having equal functions or equal effects are provided with same reference numerals in the different figures such that the description of these elements represented in different embodiments is mutually exchangeable and mutually applicable.

Figure 13:
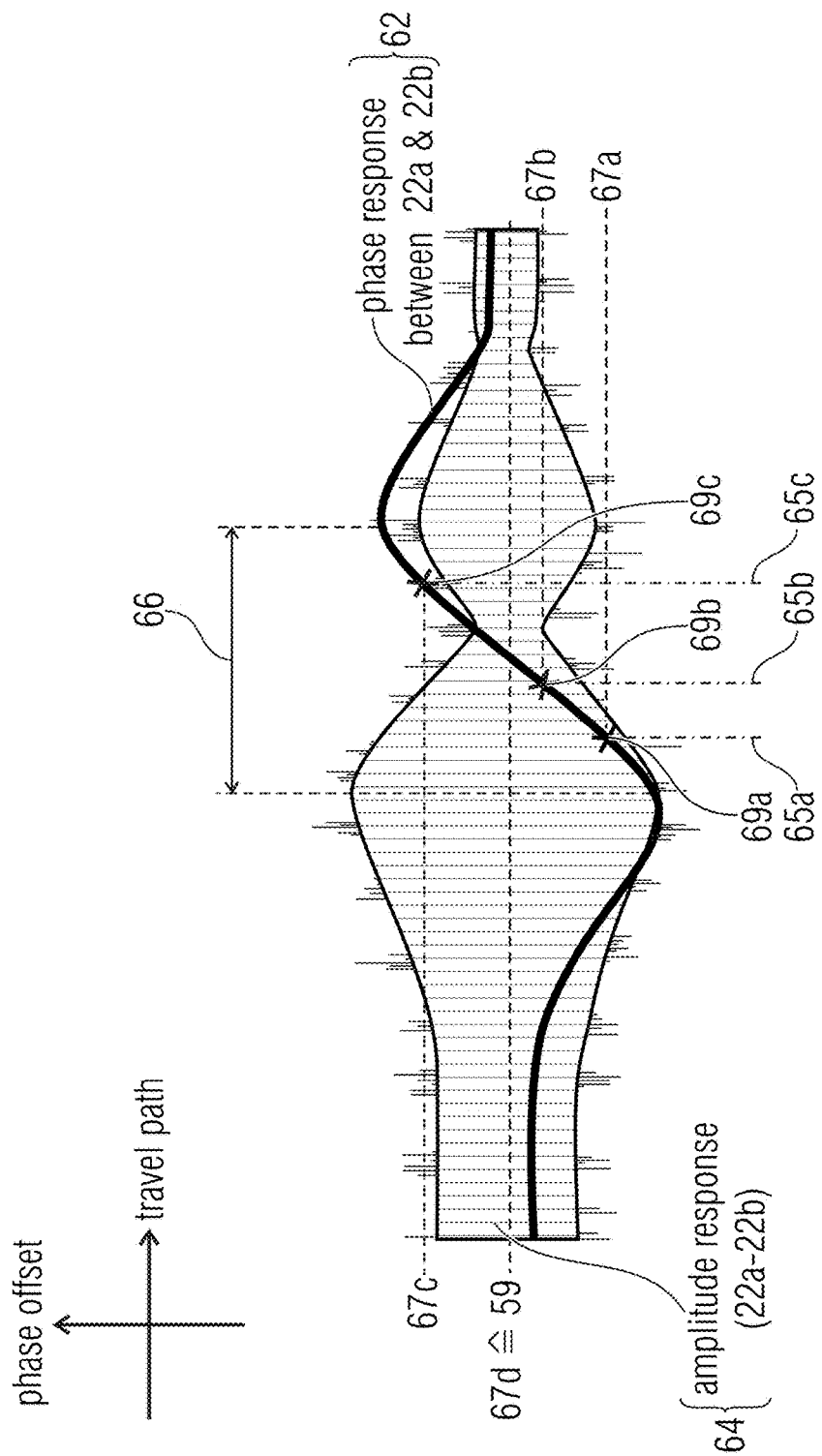

A schematic block circuit diagram of a sensor will be discussed below using FIG. 1 and making reference to FIG. 13, the sensor being configured to allow the position of a coupling element to be determined based on a phase shift of two output signals. FIG. 13 shows a comparison of an amplitude response and a phase response of the two output signals.

FIG. 1 shows a schematic block circuit diagram of a sensor 10. The sensor 10 includes a primary coil 12 having a width 13, and two secondary coils 14a and 14b having widths 15a and 15b, respectively. A coupling element 16 is arranged between the primary coil 12 and the secondary coils 14a and 14b. The coupling element may be part of the sensor 10 or part of another device, such as, for example, a pump piston of a pump, the position or change in position of which is to be determined or detected by the sensor 10.

An excitation signal 18 may be applied to the primary coil 12. A magnetic field based on which a current is caused by the excitation signal 18 to flow through the primary coil 12 may couple into the secondary coils 14a and 14b, wherein a measure of coupling in and, thus, an amplitude of output signals 22a and 22b of the secondary coils 14a and 14b may be dependent on a position of the coupling element 16. In addition, a dynamic phase shift between the excitation signal 18 and the output signals 22a and 22b may be dependent on the position of the coupling element. A phase shift between the excitation signal 18 and the output signals 22a and 22b may include a static or quasi-static portion and a dynamic portion. The static or quasi-static portion of the phase shift may be in an environment of the primary coil 12 and/or the secondary coils 14a and 14b, such as, for example, a metallic casing of the coil arrangement, or external magnetic fields, such as, for example, the earth's magnetic field or magnetic fields generated by neighboring machines, such as, for example, transformers. The dynamic portion of the phase shift may be based on a position or change in position of the coupling element 16, when the coupling element is located in the magnetic field of the primary coil 12. A frequency of the output signals 22a and 22b here equals a frequency of the excitation signal 18.

The secondary coil 14a and the secondary coil 14b are connected to the same reference potential such that the output signals 22a and 22b may be represented in a way referenced to a common reference potential, thereby making comparability of the output signals 22a and 22b easier. In addition, the secondary coils 14a and 14b are connected in phase opposition, i.e. a change in the phase shift between two points in time with a positive sign, i.e. with an increasing phase shift, in the output signals 22a and 22b results in a change in the phase shift, with a negative sign, i.e. with a decreasing phase shift, in the output signals 22b and 22a. In other words, a change in position of the coupling element 16 from a first point in time to a subsequent point in time may result in a first difference in phase shift between the two points in time and between the excitation signal 18 and the output signal 22a and in a second difference in phase shift between the two points in time between the excitation signal 18 and the output signal 22b. The first and second differences may basically be of identical magnitudes and comprise mutually different signs such that a mathematical operation, such as difference, sum, multiplication or division, will provide, based on the first and the second difference at the first and a subsequent point in time, a result variable between the points in time which may be attributed to the change in position of the coupling element 16.

The coupling element may exemplarily be a metallic or ferromagnetic material.

In other words, the excitation signal 18 results in a magnetic field generated by the primary coil 12. Changes in an amplitude of the excitation signal 18 result in a variable magnetic field around the primary coil 12. The secondary coils 14a and 14b may be arranged to be symmetrical relative to the primary coil 12, i.e. the output signal 22a of the secondary coil 14a and the output signal 22b of the secondary coil 14b are induced by the variable magnetic field generated by the primary coil 12 to be nearly identical when there is no coupling element 16. This may exemplarily be made possible using same or essentially same values of inductivity of the coils in connection with equal or basically equal distances of the secondary coils 14a and 14b to the primary coil 12. Alternatively, mutually different values of inductivity may exemplarily be compensated by a mutually different distance of the secondary coils 14a and 14b to the primary coil 12. In addition, orienting a respective secondary coil 14a or 14b relative to the primary coil 12 may take place such that a degree to which a magnetic field of the primary coil will couple into the respective secondary coil 14a or 14b, compensates mutually different values of inductivity or distances. Alternatively, an asymmetrical coil arrangement may be used to output, for example, mutually different amplitudes and/or changes in amplitudes of the output signals 22a and 22b.

Based on the symmetrical arrangement of the secondary coils 14a and 14b relative to the primary coil 12, the output signals 22a and 22b may also be equal in their center position, i.e. zero position, when there is the coupling element 16. A change in the position of the coupling element 16, exemplarily along a direction of movement 24, results in a change in the output signals 22a and 22b based on a changed coupling between the primary coil 12 and the secondary coils 14a and 14b. The change in the signals 22a and 22b may include a change in amplitude or a change in the phase position of the output signal 22a or 22b relative to the excitation signal 18.

The sensor 10 includes an evaluating means 26 configured to receive the output signals 22a and 22b and to evaluate a phase offset between the output signals 22a and 22b. The evaluating means 26 is additionally configured to provide a sensor output signal 28 which indicates the position or the change in position of the coupling element 16, exemplarily by the fact that a change in position of the coupling element 16 in the direction towards the secondary coil 14a or the secondary coil 14b results in an increasing phase offset between the output signals 22a and 22b and, thus, a change in the sensor output signal 28.

The phase shift between the output signals 22a and 22b here may be uninfluenced by external interfering influences, such as, for example, magnetic fields, whereas amplitude values or amplitude differences may be impeded by interfering influences, as is exemplarily illustrated in FIG. 13.

The uninfluenced phase shift or phase difference, or influenced only to an insignificant degree, allows drawing conclusions as to the position of the coupling element 16 and the sensor output signal 28 may be output by the evaluating means 26 such that there is a directly proportional or indirectly proportional connection between the phase offset between the output signals 22a and 22b and the sensor output signal 28 such that the position of the coupling element 16 may be determined based on the sensor output signal 28 or by considering only and evaluating the phase offset.

In other words, a position or change in position may be determined without additionally necessitating the amplitude response. The phase offset here may be responsible decisively for the precision of the sensor output signal such that the amplitude response here may be dispensed with or such that, solely by knowing the phase information, the position of the coupling element may be determined at least as precisely as has been the case so far based on the amplitude information, plus phase information for a case-by-case distinction.

Of advantage with this embodiment is the fact that phase shifts between the excitation signal 18 and the output signals 22a and 22b may be uninfluenced by the presence of external magnetic fields or ferromagnetic materials such that a dynamic portion of the phase shift allows robust and reliable positional detection of the coupling element 16 which is movable relative to the primary coil 12 and/or the secondary coils 14a and 14b.

With a frequency of the excitation signal 18 which is tuned to an inductance of the primary coil 12 and/or the secondary coils 14a and 14b, determining the position or determining the change in position may allow a high spatial resolution of the coupling element 16.

A frequency of 1 MHz may exemplarily be selected for the excitation frequency such that an inductance of the coils of 1 MHz corresponds to an impedance of 50Ω. This impedance may represent a potentially suitable load resistance used by an amplifier for driving the primary turn or winding, i.e. primary coil of the sensor (LVDT), which means that the amplifier is able to easily drive the current necessitated. In other words, it may be necessitated for the amplifier to be able to provide a sufficient quantity of current at a certain frequency so that the LVDT does not have a short-circuiting effect for the amplifier.

The spatial resolution may be predetermined by a TDC use and its temporal resolution, such as, for example, in a GP22 model, the temporal resolution of which is 22 ps. With an excitation signal of 1 MHz, i.e. a cycle duration of 1 μs, which corresponds to an angular range of 360°, this results in a phase resolution of roughly 8 m°. With a frequency of 1 kHz, a resolution of roughly 8μ° would be obtained correspondingly; this, however, would necessitate a sensor (LVDT) with higher an inductance, in other words, with a greater number of turns, in order for the coil not to have a short-circuiting effect.

Additionally, it must be kept in mind that the signals may be noisy due to the signal pre-processing (exemplarily amplification), which may reduce the resolution. Thus, the spatial resolution of the LVDT is not limited by the sensor itself but by the temporal resolution of the TDC plus the noise of signal pre-processing.

In addition, a phase evaluation, that is determining the phase offset, may be realized at little circuit complexity, such as, for example, by using integrated circuits (IC).

The sensor 10 may exemplarily be configured to monitor the position of a piston of a pump. The coupling element 16 may exemplarily be connected to the piston of the pump. Alternatively, it is also feasible for the piston of the pump to be the coupling element 16, when the piston exemplarily includes a ferromagnetic material.

Interfering bodies, such as, for example, permanent magnets, electromagnetic drives, metallic or ferromagnetic elements, may be arranged in direct proximity to the coupling element. Evaluating the phase response may thus result in the sensor 10 to be implemented to be robust, that is insensitive towards interfering quantities of this kind.

In other words, the sensor 10 may also be considered to be a novel approach for evaluating LVDT sensors, or as an LVDT path sensor technology, i.e. a linearly variable differential transformer, as a positional sensor in the environment of permanent magnets and ferromagnetic materials.

Figure 2:
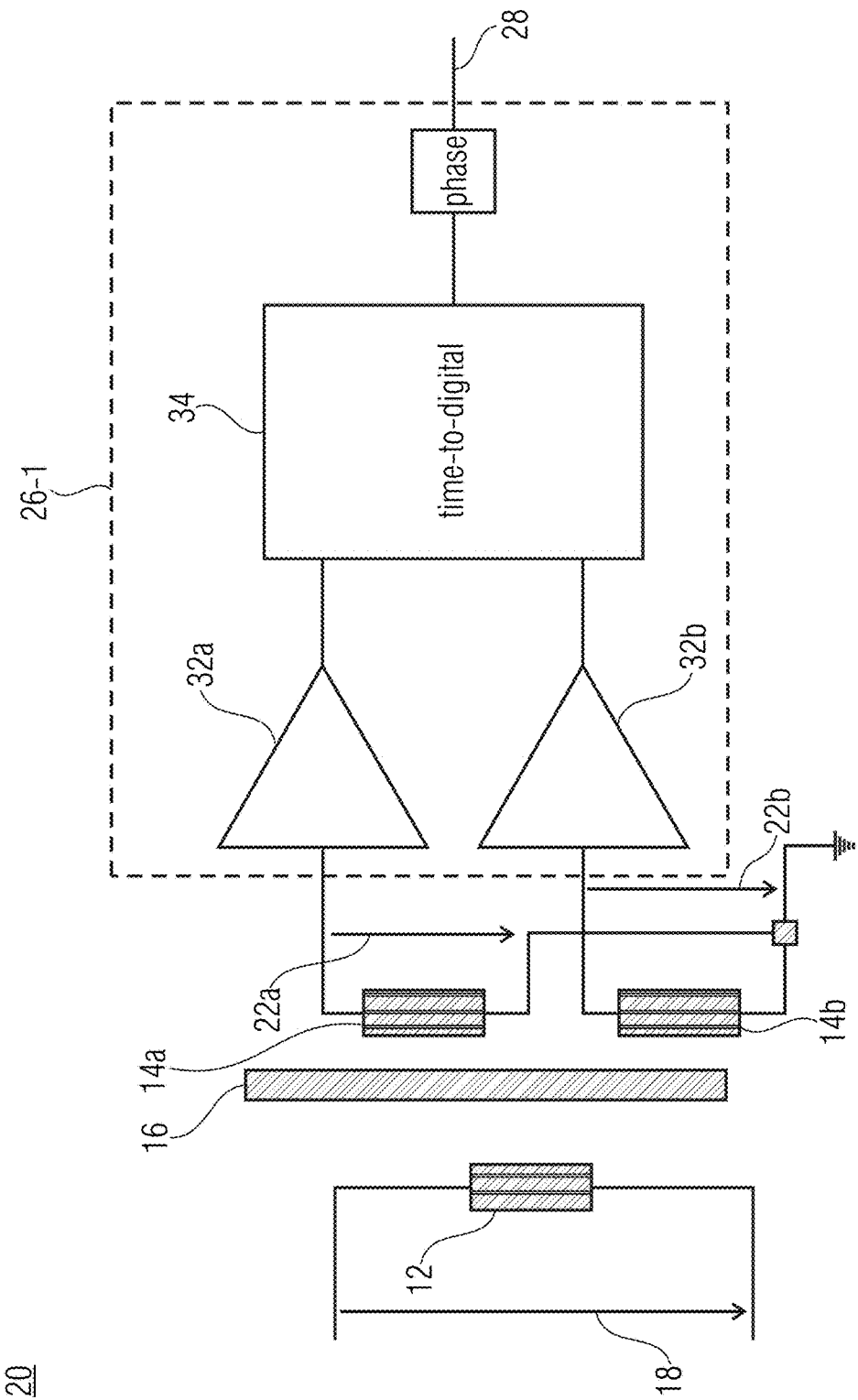
FIG. 2 is a schematic block circuit diagram of a sensor, wherein an evaluating means comprises two amplifying means and a time-to-digital converter.

FIG. 2 shows a schematic block circuit diagram of a sensor 20 in which the evaluating means 26-1 includes an amplifying means 32a and an amplifying means 32b. The amplifying means 32a is configured to amplify an amplitude of the output signal 22a of the secondary coil 14a. The amplifying means 32b is configured to amplify an amplitude of the output signal 22b of the secondary coil 14b.

The evaluating means 26-1 additionally includes a time-to-digital converter (TDC) 34, such as, for example, the GP 22 model by the acam company or the THS788 model by the Texas Instruments company, which is configured to detect a temporal offset between a characteristic of the output signal 22a and a characteristic of the output signal 22b. The characteristics may exemplarily be a signal maximum, a signal minimum, a zero crossing or a certain amplitude value of the respective output signal. Alternatively, it is also feasible for the characteristic to be a point of reversal of a mathematical derivation or a value of the respective waveform determined or calculated in a different manner. The temporal offset may relate to the same characteristic or to mutually different characteristics. This means that, for example, an increasing edge may be detected with a first signal and a decreasing edge of the signal with a second signal. A shift between the characteristics, such as a difference in time between increasing and decreasing edges, may be considered in the measuring signal as an offset, since both output signals 22a and 22b comprise the same frequency. When, for example, the amplifying means 32a or 32b is a comparator having an asymmetrical voltage supply, i.e. having a potential difference between, for example, zero volts and a potential un-equaling zero, the amplifying means 32a or 32b may output a signal value equaling zero or approximately zero when an amplitude of the output signal 22a or 22b is below a predefined threshold value of the comparator. The amplifying means 32a or 32b may output a signal value roughly equaling the supply voltage of the amplifying means 32a or 32b when the amplitude of the output signal 22a or 22b is above the predefined threshold value.

When, for example, the excitation signal 18 is a periodic signal, such as, for example, a sinusoidal signal, the output signals 22a and 22b may also be periodic or sinusoidal such that the predefined threshold values of the amplifying means 32a and 32b are periodically exceeded above and below. The time-to-digital converter 34 may be configured to measure a temporal offset between the characteristic occurring in the output signal 22a and the output signal 22b, such as, for example, exceeding or falling below the threshold value, and provide a digital value or a digital signal, the digital value or digital signal being a measure of the phase offset or correlated with the phase offset. The measure of the phase offset may exemplarily be a time difference value. Thus, the digital value may be a number of clock cycles between the output signal 22a exceeding or falling below the threshold value and the output signal 22b subsequently exceeding or falling below the threshold value. In other words, the output signal 22a may form the start or stop signal and the output signal 22b may form the stop or start signal for a time difference measurement. Additionally, a first period of the stop signal may exemplarily be ignored for phase or time measurement and a time difference measurement may take place based on a second period. The first period may be used to thereby allow detecting the direction of the coupling element 16 such that detecting the direction may be realized without additional expenditure.

In other words, due to the very high temporal resolution of commercially available TDC elements, a correspondingly high spatial resolution of the LVDT sensor can be achieved. Using a TDC element allows directly obtaining the measurement data in a digital form such that an analog-to-digital converter for digitalizing analog measurement values may be dispensed with. Alternatively, instead of a commercially available TDC element, the time-to-digital conversion may also be realized using a microcontroller, a microprocessor, a (micro) computer, a field-programmable gate Array (FPGA), a complex programmable logic device (CPLD), a digital signal processor, an application-specific integrated circuit (ASIC) or the like.

Alternatively, the amplifying means 32a and/or 32b may comprise a symmetrical voltage supply, i.e. having a potential difference between a positive and an, as far as magnitude is concerned, equal potential value such that an amplified signal, such as, for example, the output signals 22a and 22b, comprise zero crossings. In principle, any circuit threshold value within the output voltage range of the amplifying means may be defined to be the triggering result, such as, for example, a voltage mean value or voltage mean value with an offset, such as, for example, 100 mV, 200 mV or 500 mV.

The amplifying means 32a or 32b may alternatively also be realized as an analog or digital amplifier or an operational amplifier or a transistor.

Figure 3:
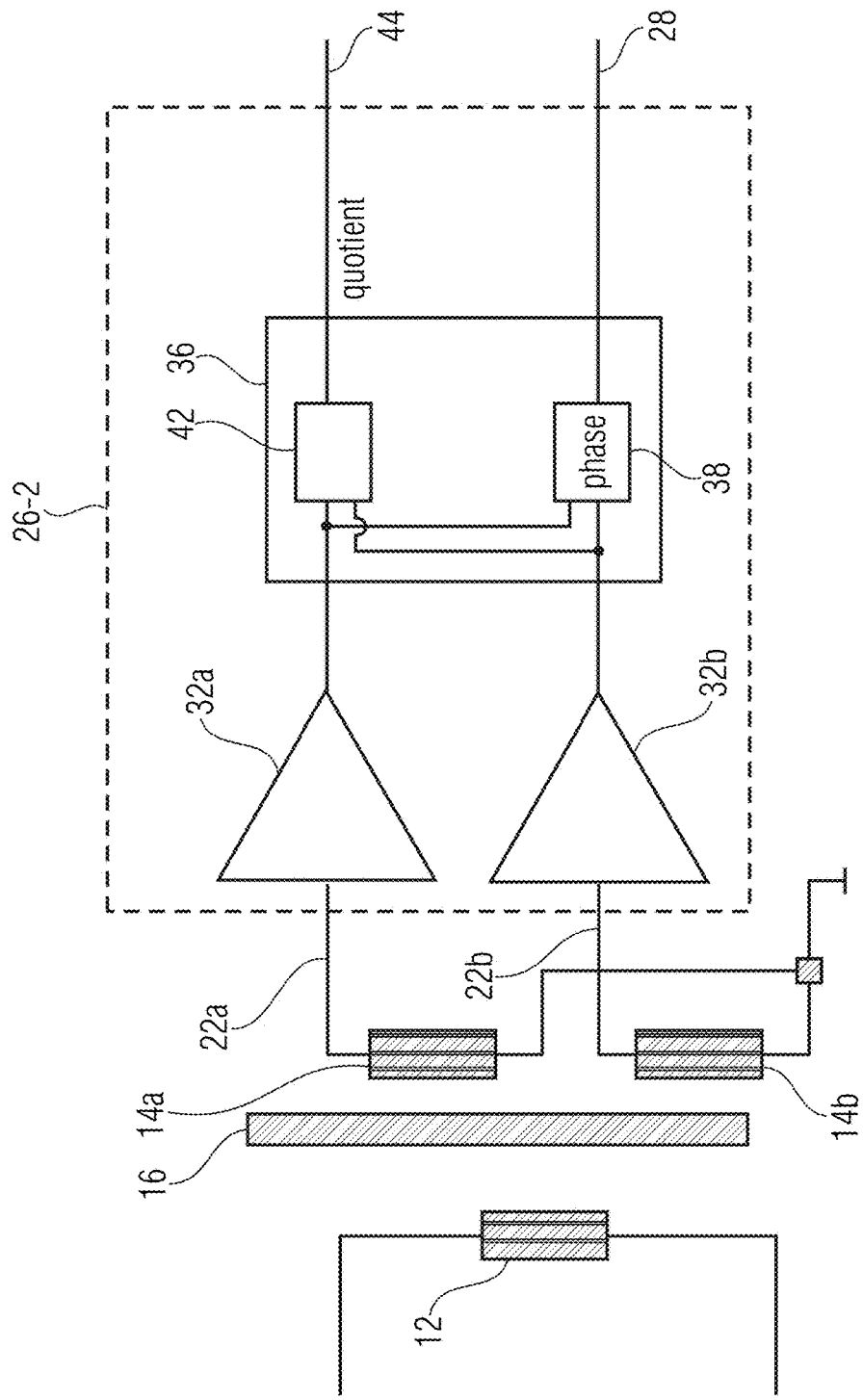
FIG. 3 is a schematic block circuit diagram of a sensor comprising an evaluating means which comprises a calculating means having a phase detector and a quotient determiner.

FIG. 3 shows a schematic block circuit diagram of a sensor 30 comprising an evaluating means 26-2 which comprises a calculating means 36. The calculating means 36 includes a phase detector 38 and a quotient determiner 42. The phase detector 38 and the quotient determiner 42 are each connected to the amplifying means 32a and 32b, i.e. the phase detector 38 and the quotient determiner 42 are each configured to receive the output signals 22a and 22b amplified by the amplifying means 32a and 32b. In other words, the output signals 22a and 22b amplified by the amplifying means 32a and 32b, relative to the phase and quotient characteristics to be evaluated, are the output signals 22a and 22b.

The phase detector 38 is configured to determine a phase difference between the output signals 22a and 22b or between the signals output by the amplifying means 32a and 32b. The phase detector 38 may obtain the phase difference exemplarily using a multiplication of the two output signals 22a and 22b. This is illustrated below exemplarily using calculating operations based on cosine portions of signals. When wt is a period duration of the excitation signal and the output signals 22a and 22b and the output signal 22a or 22b is offset relative to the output signal 22b or 22a by the phase difference $\phi$, a multiplication of the cosine portions of the respective signals exemplarily has the following result:

$$\cos(\omega t) * \cos(\omega t + \varphi) = \cos(\omega t) * (\cos(\omega t) * \cos(\varphi) - \sin(\omega t) * \sin(\varphi)) =$$

$$\cos^2(\omega t) * \cos(\varphi) - \cos(\omega t) * \sin(\omega t) * \sin(\varphi) =$$

$$\cos^2(\omega t) * \cos(\varphi) - \left(\frac{1}{2}(\sin(\omega t - \omega t) + \sin(\omega t + wt))\right) * \sin(\varphi) =$$

$$\cos^2(\omega t) * \cos(\varphi) - \frac{1}{2}\sin(2\omega t) * \sin(\varphi) =$$

$$\frac{1}{2}(1 + \cos(2\omega t) * \cos(\varphi)) - \frac{1}{2}\sin(2\omega t) * \sin(\varphi) =$$

$$\frac{1}{2}\cos(\varphi) + \frac{1}{2}\cos(2\omega t) * \cos(\varphi) - \frac{1}{2}\sin(2\omega t) * \sin(\varphi)$$

When, for example, terms which are dependent on the frequency w are extracted, exemplarily using a low-pass filter, i.e. set to zero, this allows drawing conclusions as to the direct component, i.e. the term which is dependent on the frequency ω:

$$\frac{1}{2}\cos(\varphi)$$

Same is based on the phase shift $\phi$, the result being a measure of the phase $\phi$.

The quotient determiner 42 is configured to form a ratio of the amplified signals, exemplarily by dividing a signal amplitude of the amplifying means 32a or 32b by a signal amplitude of the amplifying means 32b or 32a. Alternatively, the ratio may also put other values of the output signals 22a and 22b in relation to one another. The quotient determiner 42 is additionally configured to output an amplitude ratio signal 44 based on the quotient so that, for example, an amplitude of the amplitude ratio signal is a measure of the quotient.

The amplitude ratio signal 44 may be used for referencing positional information or information of a change in position of the coupling element 16, exemplarily when using the sensor 30 in a non-metal environment. In this way, a changed phase difference may exemplarily be correlated with a changed amplitude ratio signal 44 in order to find out a plausibility of a changed phase difference. A non-metal environment may exemplarily be a plastic pump or another device comprising a movable element which is largely or completely made of non-metal elements.

The calculating means 36 may also be referred to as a gain phase detector. Such a component may, for example, be purchased from the Analog Devices company under the name AD8302. Generally, such devices, or the phase detectors thereof, provide an output voltage which is proportional to the phase shift of two input signals. This may correspond to the direct component described before. Detecting a direction, i.e. a direction in which the coupling element 16 is shifted, may exemplarily take place by arranging a phase shifter. A predetermined phase shift between the output signals 22a and 22b may, by means of a phase shifter, result in a change in the phase result such that, for example with sinusoidal output signals 22 and 22b, a direction of movement of the coupling element 16 may be detected by evaluating the non-shifted and shifted output signals 22a and 22b. A phase shifter may shift a signal by +90° or −90°, for example, so as to obtain phase-shifted values in this way.

Figure 4:
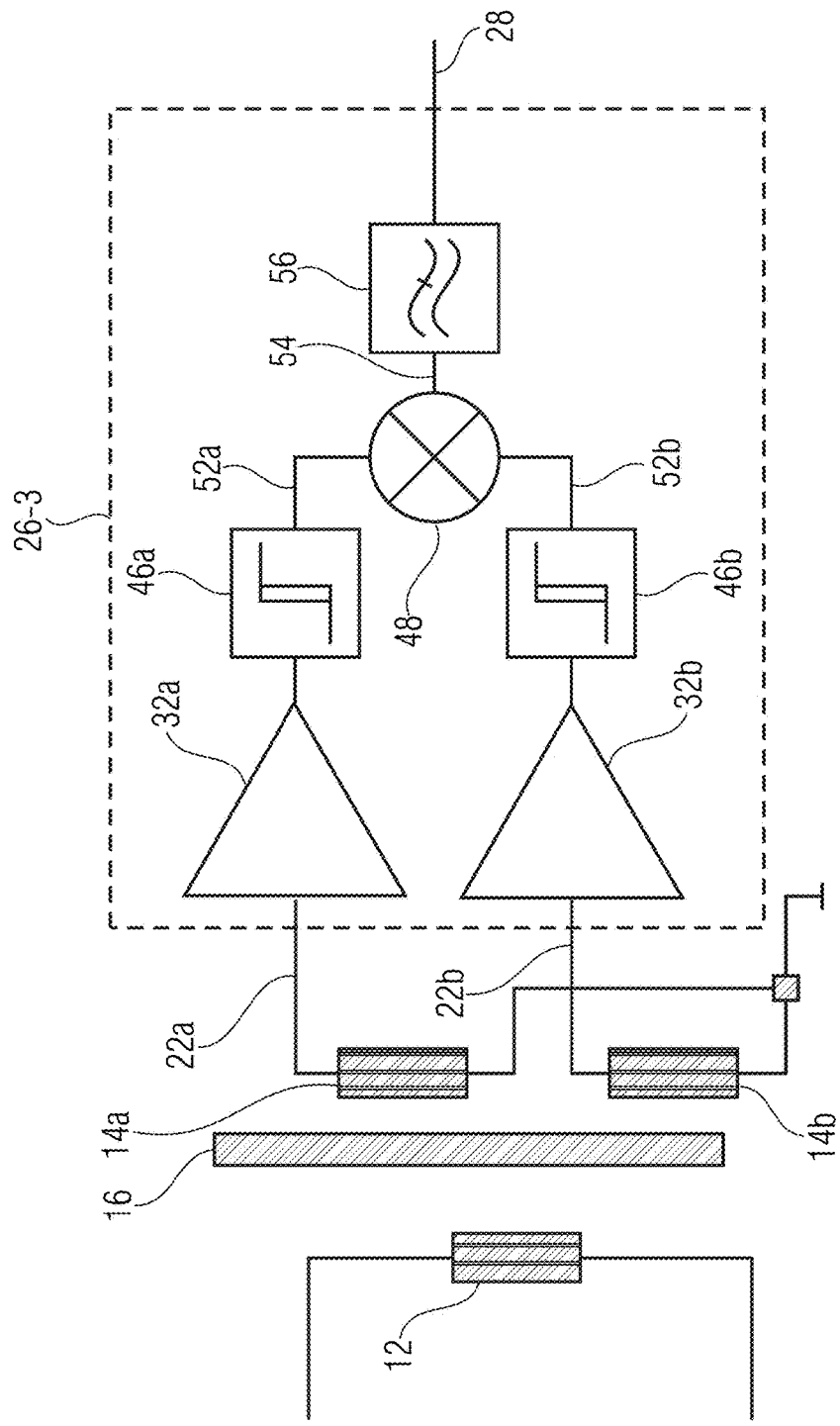
FIG. 4 is a schematic block circuit diagram of a sensor comprising an evaluating means with two signal transducers and a multiplier 48.

FIG. 4 shows a schematic block circuit diagram of a sensor 40 which includes an evaluating means 26-3 comprising the amplifying means 32a and 32b and two signal transducers 46a and 46b and a multiplier 48. The signal transducers 46a and 46b are configured to amplify a characteristic of the output signal 22a or 22b or the amplified signals provided by the amplifying means 32a and 32b, i.e. emphasize these characteristics. The signal transducers 46a and 46b are additionally configured to basically leave phase information of the output signals 22a and 22b or a phase difference between the output signals 22a and 22b unchanged. In other words, the transduced signals 52a and 52b may exhibit the same phase difference to each other as do the output signals 22a and 22b. Alternatively, the phase difference between the transduced signals 52a and 52b may also be proportional, i.e. recoverable, to the phase difference of the output signals 22a and 22b. The signal transducers 46a and 46b may exemplarily be Schmitt trigger circuits or comparator circuits and are configured to amplify a characteristic of the output signal 22a or 22b or the amplified signals provided by the amplifying means 32a and 32b, i.e. emphasize these characteristics. The characteristics may exemplarily be a zero crossing or exceeding or falling below a threshold value. Thus, a signal transducer 46a or 46b may exemplarily generate a rectangular signal based on a sign of a signal provided by the amplifier 32a or 32b, as is exemplarily illustrated in FIG. 5 below.

The multiplier 48 may exemplarily be an analog or digital multiplier and is configured to multiply the transduced signals 52a and 52b by each other. The multiplier 48 is additionally configured to provide a multiplication signal based on a result of the multiplication of the transduced signals 52a and 52b. The multiplication signal 54 may comprise a direct component in dependence on the phase shift between the output signals 22a and 22b or the transduced signals 52a and 52b. The evaluating means 26-3 includes a low-pass filter 56 configured to receive the multiplication signal 54 and provide the sensor output signal 28 based on the direct component of the multiplication signal 54.

In other words, the direct component of the multiplication of two input signals may correspond to the magnitude or a measure of the phase difference.

Additionally arranging a phase shifter allows recognizing the direction of movement of the coupling element 16, entailing only little circuit complexity.

Figure 5:
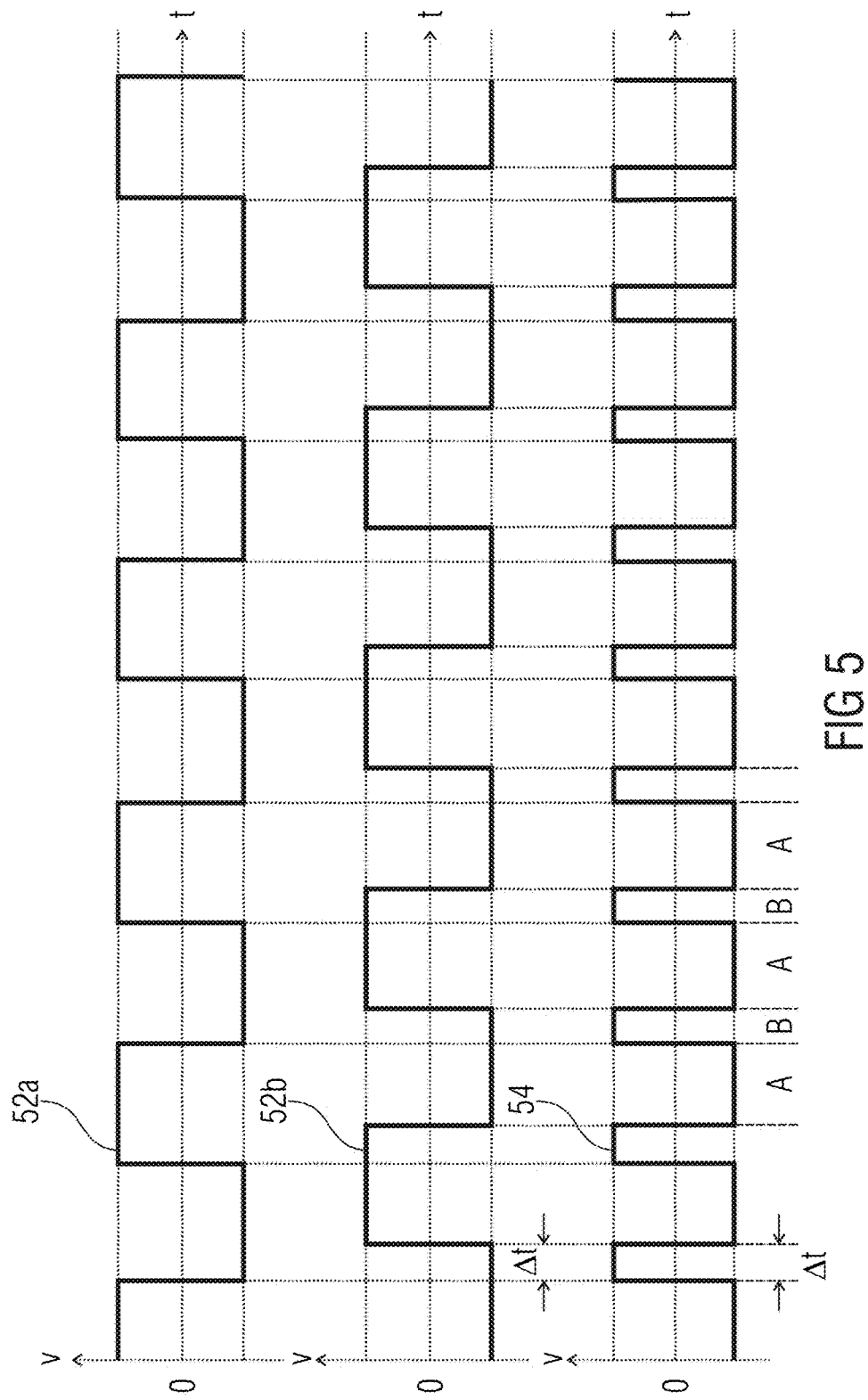
FIG. 5 is a schematic comparison of the two transduced signals of FIG. 4 for illustrating the information contents of the direct component of a multiplication signal.

FIG. 5 shows a schematic comparison of the two transduced signals 52a and 52b from FIG. 4 for illustrating the contents of information of the direct component of the multiplication signal 54.

The transduced signals 52a and 52b are exemplarily illustrated symmetrically around a zero signal value. In other words, the transduced signals 52a and 52b have no mean value. Alternatively, it is also conceivable for the transduced signals 52a and 52b to comprise a mean value, exemplarily when the transduced signals 52a and 52b comprise signal amplitudes which alternate between zero and a positive or negative maximum amplitude. The output signals equal in frequency, which are transduced to form the transduced signals 52a and 52b, comprise a phase offset which is measureable in the time range at the time difference Δt. In time intervals A, the transduced signals 52a and 52b exhibit mutually different signs such that the multiplication signal 54 has a negative sign. In time intervals B, the transduced signals 52a and 52b exhibit equal signs such that the multiplication signal 54 in the time intervals B has a positive sign. When the transduced signals 52a and 52b exhibit a phase offset relative to each other which is unequal to a multiple of 90°, the durations of the time intervals A are different from the durations of the time intervals B, i.e., in these cases, the multiplication signal 54 has a mean value. A quantity of the mean value may be dependent on the phase shift between the transduced signals 52a and 52b. In other words, a measure of the direct component of the multiplication signal 54 may be a measure of the phase offset between the transduced signals 52a and 52b.

Figure 6:
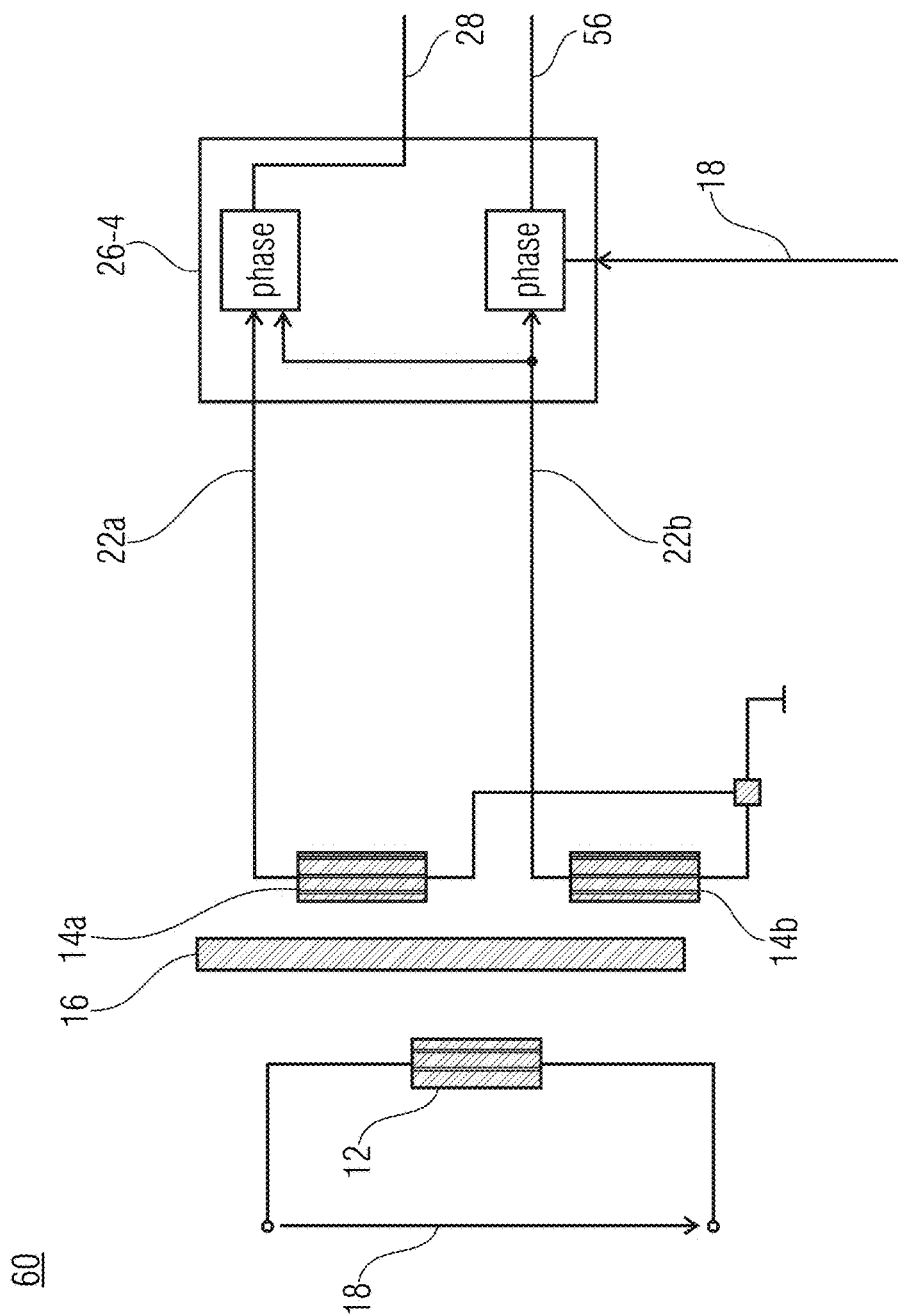
FIG. 6 is a schematic illustration of a sensor comprising an evaluating means configured to determine a temporal offset between an output signal and an excitation signal.

FIG. 6 shows a schematic illustration of a sensor 60 comprising the primary coil 12 to which the excitation signal 18 is applied, the secondary coils 40a and 40b, the coupling element 16 and an evaluating means 26-4. The evaluating means 26-4 is configured to determine a temporal offset between the output signal 22b and the excitation signal 18 and to provide an offset signal 56 which is based on the temporal offset, i.e. the phase difference between the excitation signal 18 and the output signal 22b. In other words, it is alternatively also conceivable for the evaluating means 26 to be configured to determine a phase of the output signal 22a and a phase of the output signal 22b. The evaluating means 26 may be configured to determine the phase offset based on a comparison, such as, for example, calculating the difference between the phases of the output signal 22a and the output signal 22b.

In other words, in addition to considering the phase offset between the two secondary signals 22a and 22b, in this circuit the offset thereof relative to the primary signal 18 is also evaluated. Thus, further ways of compensation may be provided, exemplarily by recognizing interfering effects by changing external magnetic fields and extracting same from the measuring signal.

When, for example, the sensor 60 is operated in a metal environment or in a metallic casing, there may be so-called basic coupling, which is dependent on the metallic environment, between the primary coil 12 and the secondary coils 14a and 14b, in addition to coupling between the primary coil 12 and the secondary coils 14a and 14b by the coupling element 16. Basic coupling may result in an offset in amplitude and/or phase in the sensor output signal 28. Thus, the offset may roughly be the same in both output signals 22a and 22b due to the symmetrical setup between the primary coil 12 and the secondary coils 14a and 14b.

The offset signal 56 may exemplarily be subtracted from the sensor output signal 28 in order to compensate the basic coupling effects. In addition, the offset signal 56 allows considering or monitoring the operating conditions of the sensor 60 since, for example, an offset changing between two points in time, i.e. a changed signal amplitude of the offset signal 56, hints at a varying, i.e. changed basic coupling between the primary coil 12 and the secondary coils 14a and 14b. Changing environmental conditions of this kind may exemplarily be further metal objects in an environment of the sensor 60.

Alternatively or additionally, the offset signal may also be determined based on a phase difference between the output signal 22a and the excitation signal 18.

Figure 7:
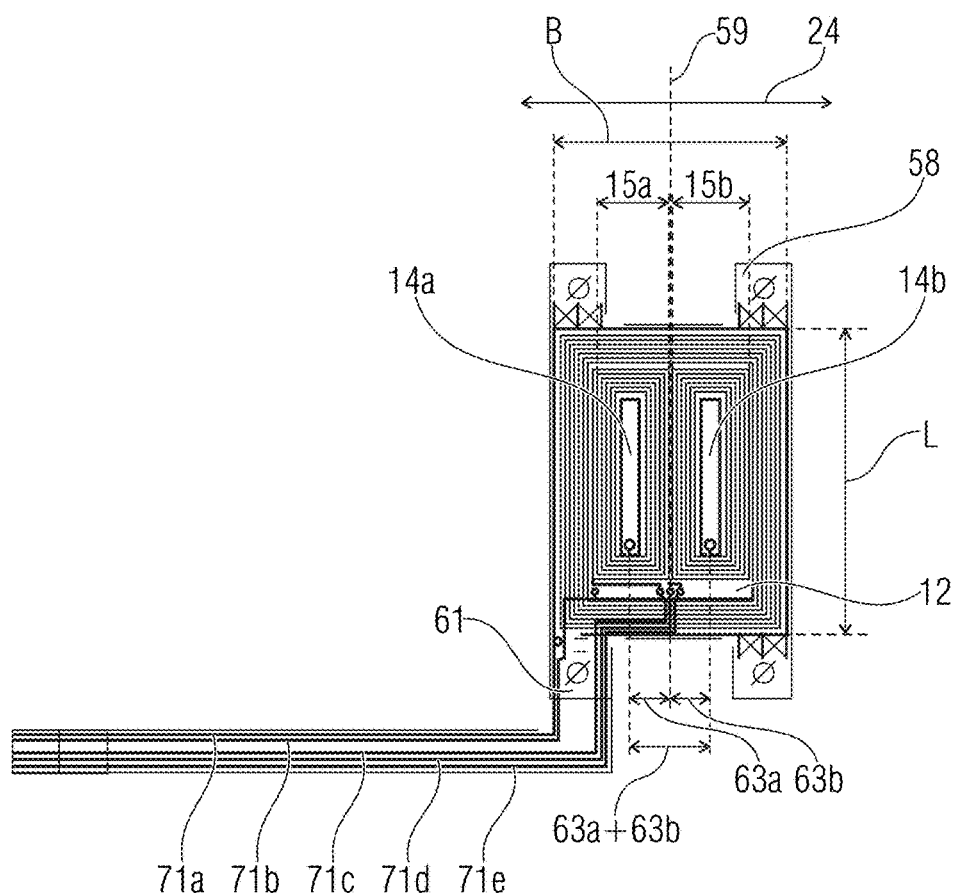
FIG. 7 is a schematic top view of a coil arrangement in which the primary coil and the secondary coils are implemented to be planar coils on a flexible substrate 58.

FIG. 7 shows a schematic top view of a coil arrangement 70 wherein the primary coil 12 and the secondary coils 14a and 14b are implemented to be planar coils on a flexible substrate 58. In other words, FIG. 7 shows a footprint of the flexible substrate 58 with a planar coil arrangement. Realizing the primary coil 12 and the second coils 14a and 14b to be planar coils on the flexible substrate 58 allows, in contrast to classical LVDT sensors, for example, not having to thread the coupling element as a coil core into the corresponding coil arrangement such that the coil arrangement may exemplarily be applied afterwards to a geometrical shape, such as a cylinder or a cone, of the core, i.e. the coupling element. In a classical LVDT arrangement, a primary coil is arranged in the center between two secondary coils arranged in a mutually lateral manner in a direction of movement. The primary coil and the secondary coils may be implemented to be round or hollow turns such that the coupling element, exemplarily implemented as a rod, is moveable in the direction of movement as a movable coil core within the primary coil and the secondary coils. Furthermore, planar coils 12, 14a and/or 14b of this kind may be manufactured cheaply by means of flex films and circuit board technology.

An overall measuring range of a sensor including the substrate 58 may exemplarily be greater than or equal to the width 15a or 15b of one of the secondary coils 14a or 14b arranged next to each other, in the direction of the predetermined direction of movement 24 of the coupling element. Thus, one half each of the overall measuring range may exemplarily be arranged around a center position 59. Alternatively, the overall measuring range may be greater than or equal to a shortest distance between the two secondary coils 14a and 14b. The turns of the primary coil 12 enclose the turns of the secondary coils 14a and 14b. In the direction of movement 24, turns on the substrate 58 which are not arranged within the width 15a or 15b may, for example, be turns of the primary coil. A length L of the coil arrangement may exemplarily be 15 mm. A width B of the coil arrangement may exemplarily be 20 mm. A distance 63a or 63b from the center position 59 to a center of the secondary coil 14a or 14b, respectively, may be 3.5 mm, such that a width 15a or 15b of the secondary coil 14a and 14b, respectively, each is double the distance 63a and 63b, respectively, and, thus, approximately 7 mm. The overall measuring range may, as the shortest distance of the two secondary coils 14a and 14b (63a+63b), or as a width of the coil, be approximately 7 mm.

Alternatively, the substrate 58, the primary coil 12 and/or the secondary coils 14a and 14b may comprise any dimensions.

Leads 71a and 71b of the primary coil 12 and/or leads 71c, 71d, 71e of the secondary coils 14a and 14b are arranged on an elongate substrate part 61. The elongate substrate part 61 may exhibit any shape or length and provide, for example, a connection to the evaluating means, at least over parts of the distance between the substrate 58 and the evaluating means. The elongated substrate part 61 is formed integrally with the substrate 58.

A planar implementation of the coil arrangement allows a highly space-saving realization, in particular with a reduced number of turns in the primary coil and/or the secondary coils. A small number of turns additionally allows realizing a comparatively low inductance of the coils. The inductance may exemplarily be in the range of 2 to 500 μH, 3 to 100 μH or 4 to 20 μH and/or exemplarily exhibit a resistance of 25Ω or 50Ω at a signal frequency of 1 MHz. Alternatively, the primary coil and/or the secondary coils may exemplarily also be realized as a wound film with, maybe, similar values of induction.

Classical LVDT implementations with a movable coil core in accordance with the above expositions, in contrast, may exemplarily comprise inductivities in the range of more than 1 mH. A reduced inductance may result in a reduced power demand of the primary coil when providing same with an alternating signal. This may allow devices to be realized at smaller a power demand and/or smaller a space demand and may reduce costs.

A thickness of the substrate 58 or the entire coil arrangement here may be in a range of approximately 100 μm, exemplarily with a thickness of less than 500 μm, less than 200 μm or less than 150 μm. Thus, a film LVDT may be adapted to different environmental conditions and environmental shapes. Planar LVDT coils may be manufactured cheaply, at present in the range of approximately 0.10 €. A range of path within which a position or change in position of the coupling element may be detected by the sensor may be adapted easily based on the film layout, exemplarily by adjusting dimensions and/or orientations of the primary coil 12 and/or the secondary coils 14a and 14b. When using a Kapton lamination for the film layout, for example, the coil arrangement may be realized to be robust relative to thermal and/or mechanical external influence.

The coil arrangement 70 may exemplarily be formed around an element of a device comprising the coupling element 10 or being arranged to be adjacent to the coupling element 10, and be mounted there.

In addition, a film layout allows a high signal swing, i.e. considerable, differentiable signal amplitudes, since high-frequency driving of the coils is possible based on a low inductance. High-frequency driving may exemplarily be in a frequency range between 500 kHz and 10 MHz, between 700 kHz and 7 MHz or between 800 kHz and 5 MHz, such as, for example, 1 MHz. Despite the high frequencies, the losses in energy generated by this may be low when reversing poles of the coils such that current consumptions of exemplarily less than 100 mA, less than 50 mA or less than 15 mA may be achieved.

Figure 8:
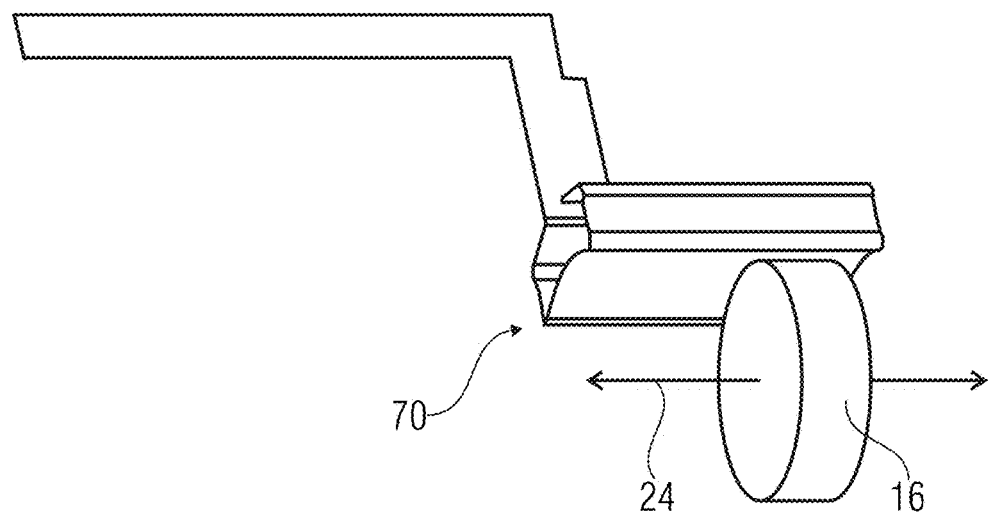
FIG. 8 shows the coil arrangement of FIG. 7 which exemplarily is bent to form a spatial arrangement.

FIG. 8 shows the coil arrangement 70 of FIG. 7, which is exemplarily bent into a spatial arrangement. The spatial arrangement forms, exemplarily, a curvature, such that the coupling element 16 which is possibly implemented as a piston, as it can be arranged within a pump, is movable co-radially along the curvature along a path of movement symmetrical to the secondary coils along the direction of movement 24.

The substrate of the coil arrangement 70 is realized as a flexible substrate, such that the same is, for example, formed around a support member where the coil arrangement 70 is arranged. The flexible substrate is formed to a three-dimensional arrangement. A surface of the three-dimensional arrangement facing the coupling element 16, which comprises the two secondary coils 14a, 14a and at least part of the primary coil 20 is curved, i.e. not planar. Thus, the non-planar surface can be adapted to a non-planar surface of the coupling element 16, such as the round non-planar outer surface of the illustrated cylinder, which is the coupling element 16. It is an advantage of such an adapted surface of the coil that a distance between the coil arrangement 70 and the coupling element 16 can be adapted across the length of the coil arrangement, for example reduced or minimized, and in this way coupling into the secondary coils 14a and 14b can be optimized.

In other words, FIG. 8 shows an implementation of the LVDT sensor as planar coil arrangement on a flexible substrate.

The primary and the two secondary coils are arranged as planar coils on a flexible substrate in the coil arrangement 70. By bending the flexible substrate, for example, a half shell is formed, in which the coupling element, for example, a ferromagnetic core, can move. It is an advantage that in contrast to classic LDVT sensors, the core does not have to be threaded into a coil arrangement, but that the coil arrangement can also be applied afterwards, for example to a cylindrical shape in which the core is located. A further advantage of the embodiment is the option of a very cost-effective production of such flex foils by means of circuit board technology.

Due to the planar implementation, the coil arrangement can be extremely space-saving. This can also be accompanied by a low number of turns and hence a comparatively low inductance of the coils. Suitable switching concepts allow an energy-efficient and high-frequency evaluation option. In other words, using higher frequencies that can be processed by the evaluating circuits can, in turn, allow the usage of low inductances.

Figure 10A:
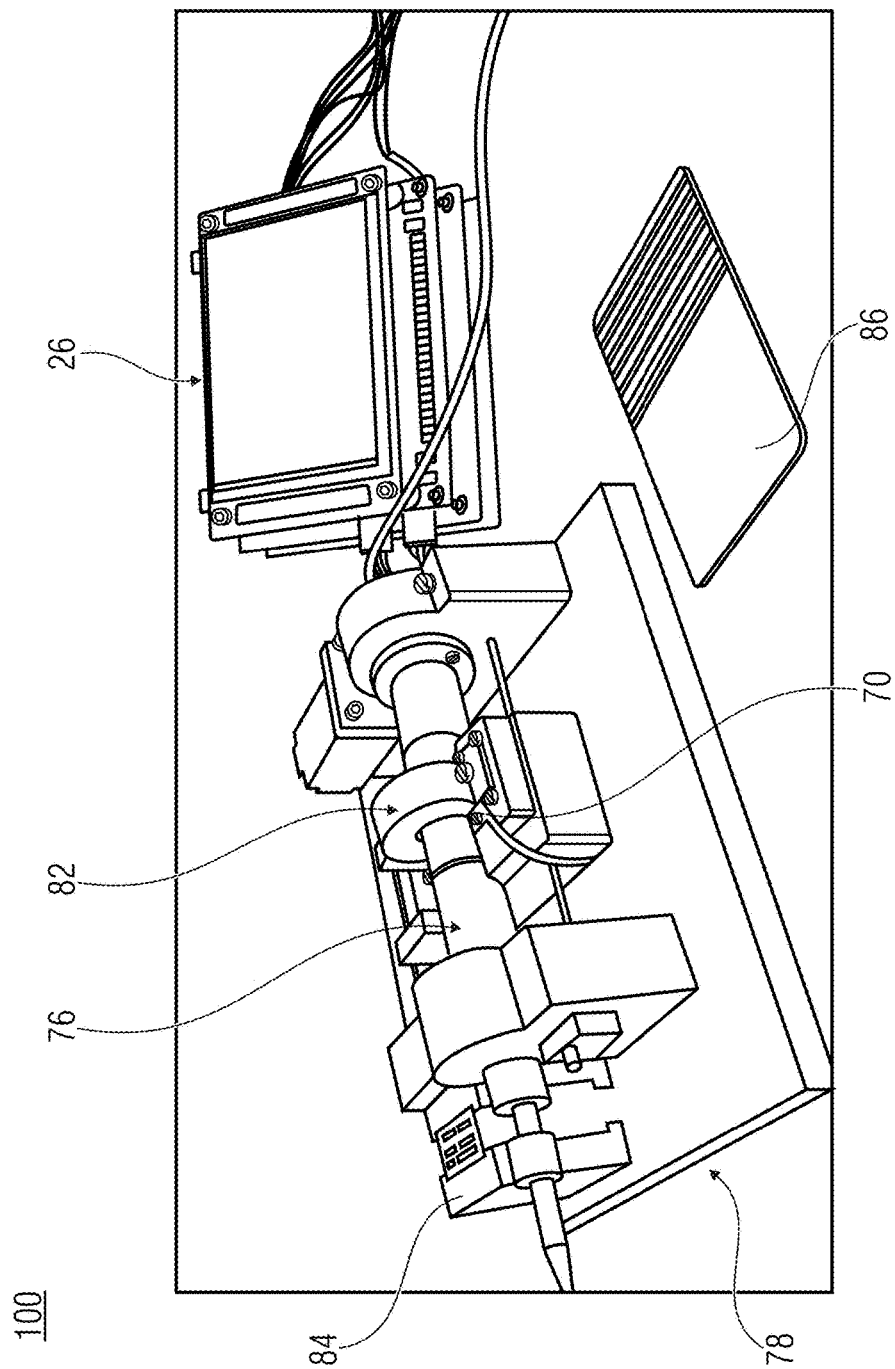
FIG. 10a shows an experimental setup comprising a piston pump having a pump casing.

FIG. 9 shows a schematic block diagram of a device 210 having a movable element 112. The device 210 can, for example, be a pump having a movable pump piston or a milling machine having a movable milling head. Basically, the device 210 can be any device. The sensor 10 or the coupling element 16 is connected to the movable element 112, such that a position of the coupling element 16 is influenced by a position of the movable element 112, i.e. depends on the same. The evaluating means 26 is configured to output the sensor output signal 28, such that based on the sensor output signal 28, a position of the movable element 112 can be deduced. Alternatively, the movable element 112 can also be the coupling element 16, such as is illustrated in FIG. 10a. In FIG. 10a, the pump piston is the coupling element 16.

While FIG. 9 shows that the sensor 10 is connected to the device 210, alternatively, one of the sensors 20, 30, 40 or 60 can be arranged on the device 210. Alternatively, any implementation of the sensors 10, 20, 30, 40 or 60 can be arranged on the device 210.

FIG. 10a shows an experimental setup 100 having a piston pump comprising a pump housing 76 and an experimental application example with flow measurement in a piston pump. The piston pump is mounted in a JIG, i.e. test setup 78. A support member 82, such as a travel carriage, is driven by a linear drive 84, which again moves a ring-shaped permanent magnet, which can represent an interfering body for the LVDT, due to the magnetic field generated by the permanent magnet, as described further above. The coil arrangement 70 as well as the ring shaped permanent magnet are arranged on the support member 82. A credit card 86 shows the miniaturization possibilities of the sensor device. In other words, the setup 100 shows an inductive path sensor technology including an interference body and a novel foil LVDT, which is driven, for example, at a frequency of 1 MHz. Alternatively, the setup can also be driven at frequencies of less than 1 MHz or more than 1 MHz.

Figure 10B:
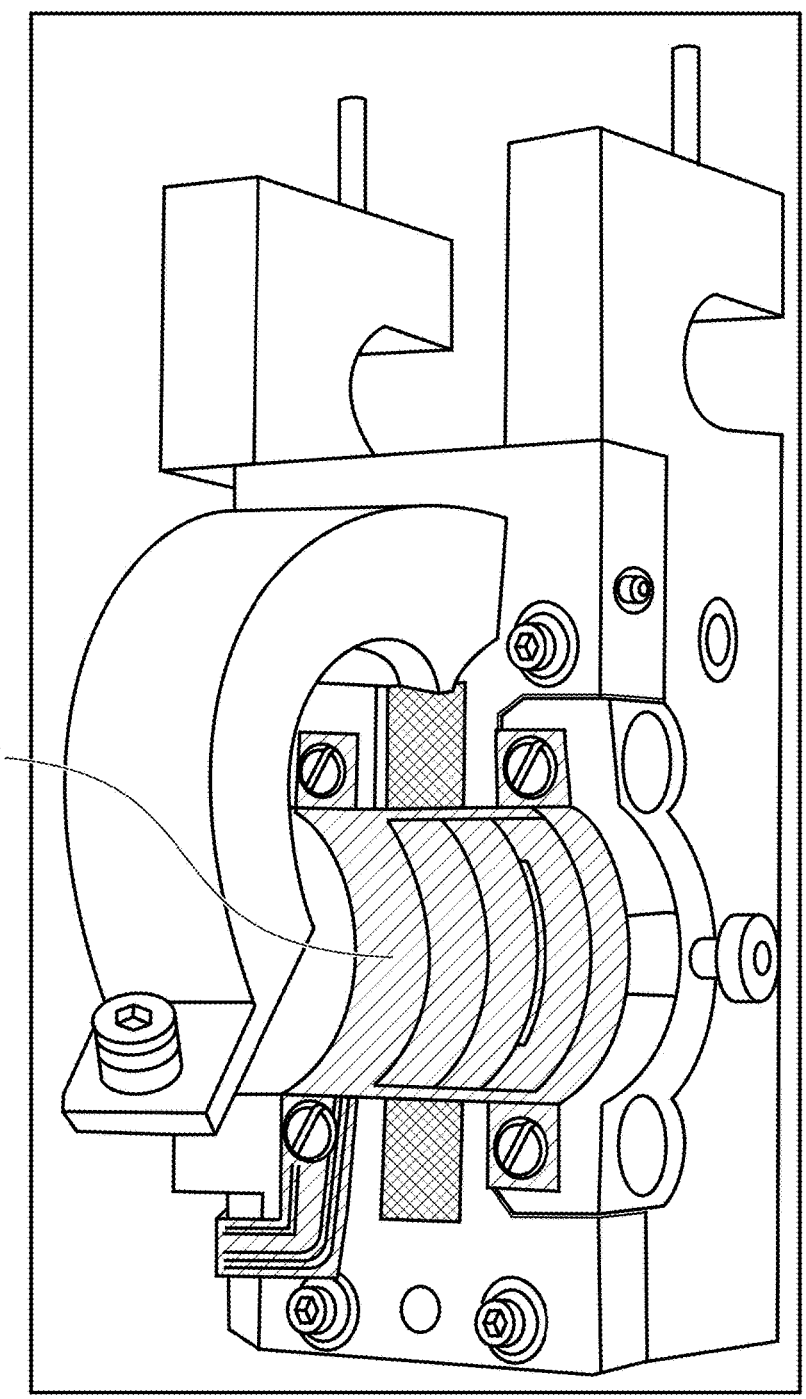
FIG. 10b is a detailed view of a support member of FIG. 10a where the coil arrangement is arranged.

FIG. 10b shows a detailed view of the support member 82 on which the coil arrangement 70 is arranged, which is adapted to the three-dimensional geometry of the support member 82 based on the planar coil technology or foil technology. In other words, surrounding the LVDT 70, a ring-shaped permanent magnet consisting of two halves is arranged in the support member 82, which is opened in the shown illustration.

FIG. 10c shows a detailed view of the section of the setup 100 as is illustrated in FIG. 10b, wherein the pump housing is enclosed by the support member 82 and a second ring-shaped half of the permanent magnet contained therein. The pump housing 76 with the piston comprising the coupling element is arranged adjacent to the sensor arrangement 70.

The setup 100 allows contactless inductive position measurement of the piston via a flexible LVDT despite permanent-magnetic interfering body. The sensor arrangement can provide high-precision measurement results and be implemented in a robust manner, i.e. can provide position resolution in the micrometer range with simultaneous insensitivity to interference with respect to external magnetic fields. Further, the setup can be produced in a very cost-effective manner.

FIG. 11 shows the planar coil arrangement coil 70 in close vicinity to an electromagnetic drive 92 which is configured to drive a pump chamber 94. In a pump chamber 94, the coupling element is arranged in a form of a pump piston whose position is to be detected.

FIG. 11 shows an LVDT having an electromagnet and phase evaluation and hence a further application option of the above illustrated embodiments.

Figure 12:
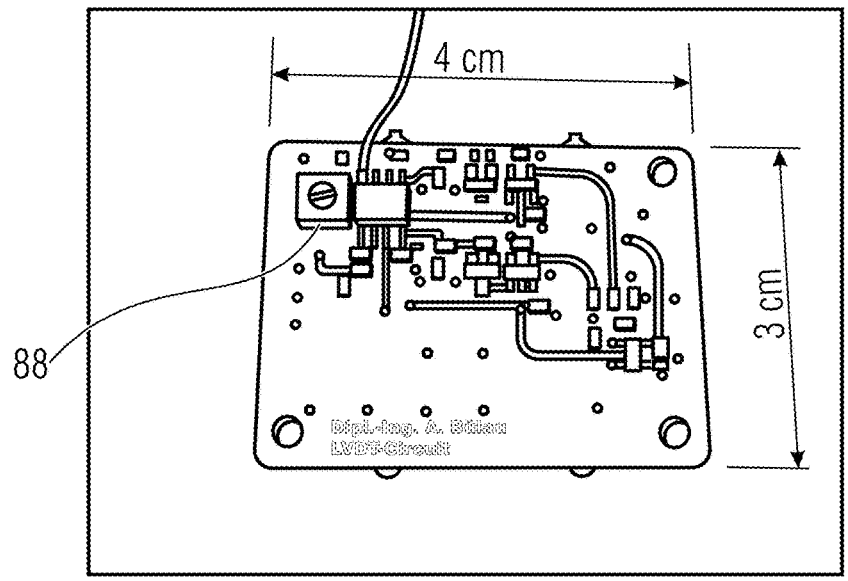
FIG. 12 is a photographic illustration of an exemplary evaluating means.

FIG. 12 shows a photographic illustration of an exemplary evaluating means 26. In its exemplary form, the evaluating means 26 has a floor area of 3 cm by 4 cm. For the evaluation, little circuit effort might be necessitated. The evaluating circuit 26 can be built up by low cost members and circuit elements. Further, the evaluating means 26 can be configured to perform amplification of the output signals directly on the board, for example in a differential amplifier 88, which is configured to amplify a differential signal of the output signals of the secondary coils in order to obtain increased interference immunity to couplings of electric fields, i.e. electromagnetic compatibility (EMC) effects. Output measurement values can have a digital form and a high resolution of, for example 8, 12, 16 or more bits. The very compact structure of the evaluating means 26 further allows current-saving operation, which can result in increased energy efficiency of the device.

In other words, FIG. 12 shows a miniaturized evaluating circuit 26 which can be used for an LVDT sensor concept. At the same time, the evaluating electronics can have very low noise, which can result in increased measurement accuracy. Remark: output signal=digital.

FIG. 13 shows a schematic graph having a phase response 62 and an amplitude response 64 between the two secondary coils, as they can be detected, for example, by a setup 100. On the abscissa, the graph shows a travel path of the coupling element, and on the ordinate a resulting measurement curve of the amplitude evaluation and phase evaluation of the output signals 22a and 22b with existing permanent and/or ferromagnetic materials in an environment of the sensor. The amplitude response 64 formed, for example, of a difference of the signal curves of the output signals 22a and 22b comprises significant influences along the measurement curve, which can be seen in the width, i.e. amplitude variation in ordinate direction on an abscissa value. The phase response 62 indicating a phase relation between the output signals 22a and 22b, however, comprises no significant influences, which can be seen in a low variation of the phase values in ordinate directions on an abscissa value. Further, the phase response is substantially linear in a range 62, which means, based on the phase response 62, unique detection of position of the coupling element is possible, such that considering the amplitude values of the output signals 22a and 22b can be omitted. This range can be an operating range of the respective sensor.

A first position or change in position, i.e. travel path, 65a corresponds to a first phase offset 67a, illustrated at a point 69a along the phase response 62. A second position, or a position change, i.e. travel path, 65b corresponds to a second phase offset 67b, illustrated at a point 69b along the phase response 62. A third position or change in position, i.e. travel path, 65c corresponds to a third phase offset 67c, illustrated at a point 69c along the phase response 62. The different positions or change in positions 65a-c each comprise a different phase offset 67a-c. This means that a phase offset 67a-c represents a position or change in position 69a-c. The third position or change in position 65c is greater than the second position or change in position 65b. The second position or change in position 65b is greater than the first position or change in position 65a.

The respectively different phase offset 67a-c between the output signals 22a and 22b in dependence on the positions or changes in positions 65a-c can be converted into a sensor output signal by an evaluating means, such that, as illustrated for the points 69a-c in the range 66, a sensor output signal value represents a position or change in position 65a-c.

The sensor output signal can be directly proportional or indirectly proportional to the position. In a directly proportional sensor output signal, the sensor output signal increases with increasing travel path or increasing position or change in position 65a-c, such that the sensor output signal at a phase offset 67b and hence the position 65b is greater than at a phase offset 67a and hence the position 65a. Further, at a phase offset 67c and hence the position 65c, the sensor output signal is greater than at a phase offset 67b and hence the position 65b.

In an indirectly proportional sensor output signal, the sensor output signal decreases with increasing position or change in position 65a-c, such that the sensor output signal at the position or change in position 65b is lower than at the position or change in position 65a. Further, at the position or change in position 65c, the sensor output signal is lower than at the position or change in position 65b.

It is obvious that this relationship between phase offset and position or change in position of the coupling element and to the sensor signal can be reversed with respect to the above statements by changing or reversing electric potentials, reference potentials of the output signals 22a and/or 22b or the usage of inverting members that change a sign of an electric potential, wherein a directly proportional or indirectly proportional connection between the sensor output signal and the phase offset is maintained.

A directly proportional connection between the position or change in position 65a-c or the phase offset 67a-c and the sensor output signal can, for example, be a linear connection like a multiplication with a constant value, a non-linear connection such as a quadratic or exponential function or a part of a trigonometric function, such as a range of the sine function in an angular range of −90° to 90° or parts thereof. Further, it can also be a combination of the stated or similar functions, such that an increasing phase offset results in an increasing sensor output signal.

An indirectly proportional connection between the position or change in position 65a-c or the phase offset 67a-c and the sensor output signal can be, for example, a division by a constant value or by a function, such as a quadratic value of a variable value depending on the phase offset. Further, it can be a multiplication with a trigonometric function, such as a cosine function in an angular range of 0° to 180° or a directly proportional function with reversed sign, such that an increasing phase offset results in a decreasing sensor output signal.

A continuous and possibly sectional linear phase response can comprise sufficient position resolution for determining the position or change in position of the coupling element.

The above statements regarding trigonometric functions are to be considered as examples. According to the addition theorems, the sine and cosine functions can be converted into each other as well as further trigonometric functions, such as a tangent, cotangent or arcsine function. Alternatively, the trigonometric functions can also be different functions or applied in a different angular range.

A phase offset 67d can correspond, for example, to a center position of the coupling element in the respective sensor arrangement, as illustrated for example as center position 59 in FIG. 7. The range 66 can, for example, represent the overall measurement range of the sensor arrangement.

The first phase offset 67a is offset by more than 25% of the overall measurement range from the center position 67d or 59 of the overall measurement range to smaller phase shifts.

The third phase offset 67c is offset by more than 25% of the overall measurement range from the center position 67d or 59 of the overall measurement range to greater phase shifts.

In other words, the phase shift across large parts or the whole detectable travel path of the coupling element, i.e. the overall measurement range, is used for determining the position or the change in position.

In other words, the phase response between the output signal 22a and the output signal 22b is completely uninfluenced by existing permanent and ferromagnetic materials. In other words, detection of direction is possible with little or no effort based on the linearity of the phase response 62. In the zero crossing of the coupling elements, the phase response can be linear, such that non-linearities and resulting effects can be avoided. Detection of direction for the movement of the core, i.e. the coupling element, is already inherently incorporated in the evaluating circuit, as illustrated by the measurement curves.

Figure 14:
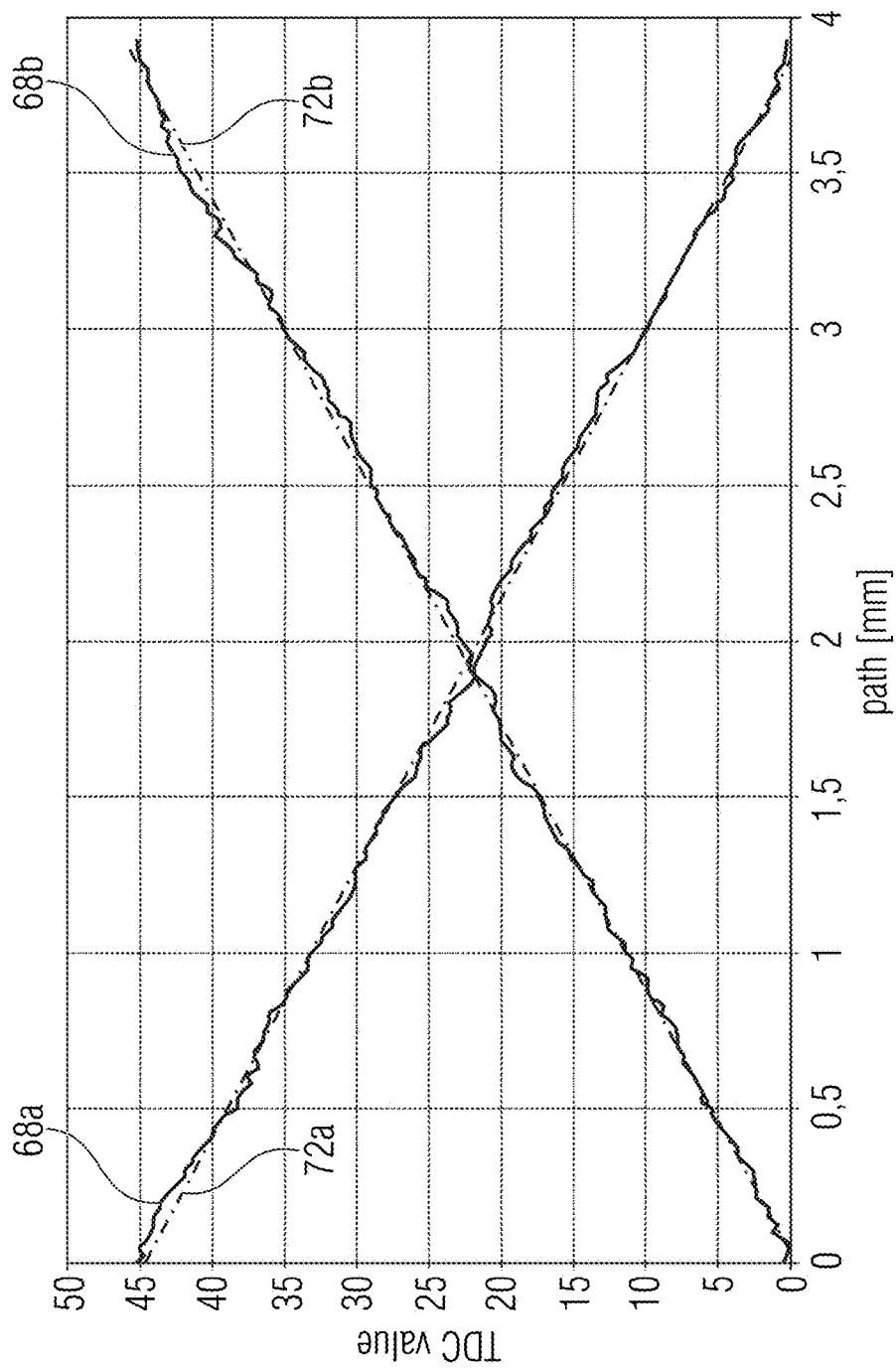
FIG. 14 shows a diagram of measuring values for a sensor arrangement when there are no magnetic elements.

FIG. 14 shows a measurement value diagram for a sensor arrangement where a LVDT is arranged around a pump chamber in the absence of magnetic elements, across a travel path in a range of 0-4 mm, as it can be recorded, for example, with a setup 100. A travel path of the coupling element or the pump piston, having a center position at a travel path of approximately 1.8 mm is plotted on abscissa of the graph. Exemplary measurement values, as they can be output from the time-to-digital converter, are plotted on an ordinate of the graph. A measurement curve 68a shows the time-to-digital values which can be output at a change in position of the coupling element with a travel speed of 30 mm/min. A measurement curve 68b shows the corresponding possible values at a return path, i.e. a movement of the coupling element in a direction opposite to the measurement curve 68a, also with a travel speed of 30 nm/min. An ideal curve 72a shows a linearization, i.e. set values for the measurement curve 68a. A set curve 72b shows the set values for the measurement curve 68b.

A phase evaluation of the output signals of the secondary coils can comprise a high, i.e. good, linearity with little deviation between the measurement value curve 68a or 68b and the set value curve 72a or 72b. A resolution of the travel path can be in a range of less than 3, less than 2, or less than 1 μm.

Figure 15:
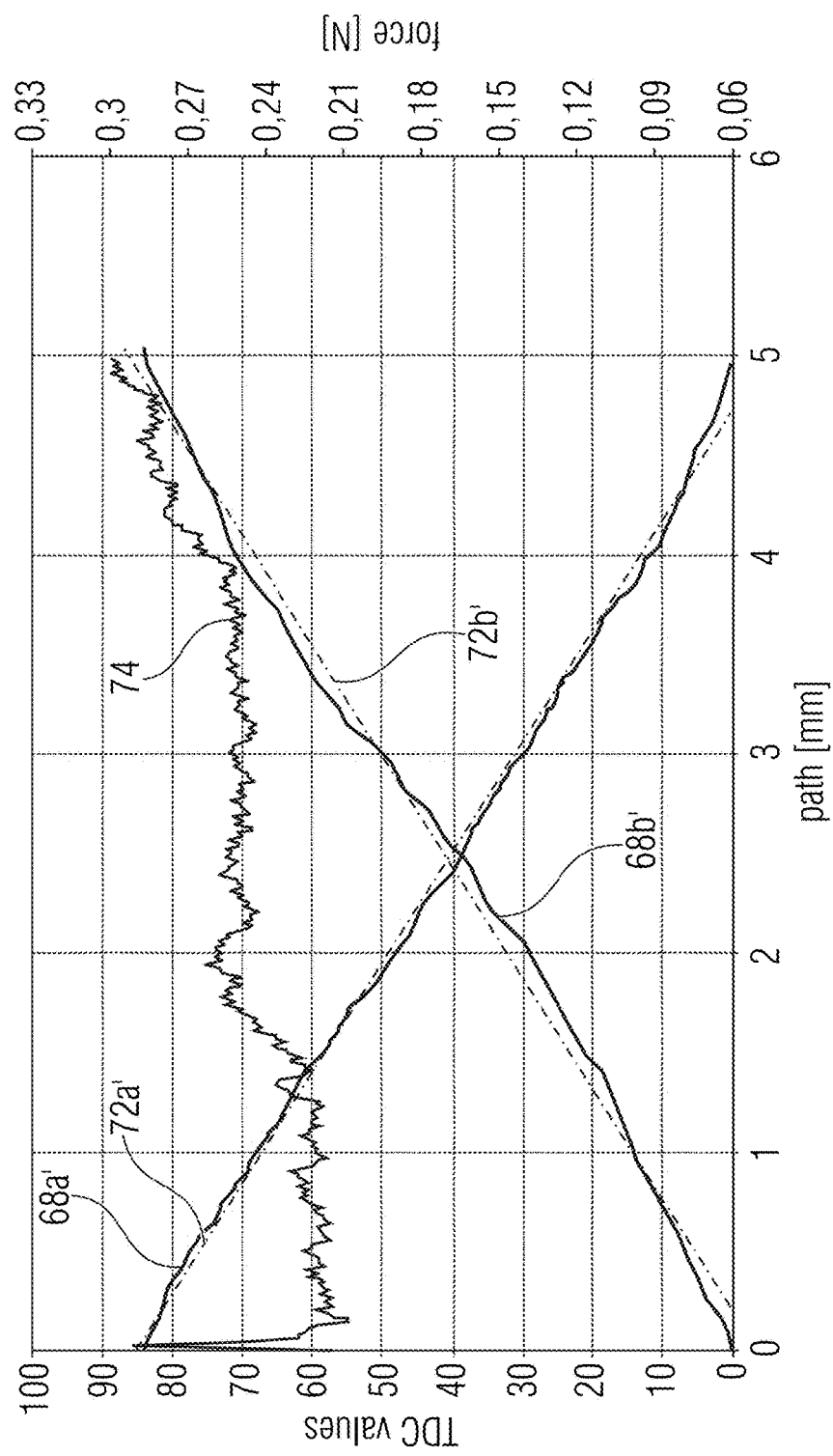
FIG. 15 is an illustration of measuring results in a measuring setup, in analogy to the results in FIG. 14, in which an electro magnet is arranged in the environment of the sensor.

FIG. 15 shows a representation of measurement results at a measurement structure analogously to the results in FIG. 14, wherein an electromagnet is arranged in the environment of the sensor. The measurement is performed such that the sensor is arranged in an electromagnetic drive implemented as yoke. A measurement value curve 68a' shows the time-to-digital values at a travel path between 0 and 5 mm with a travel speed of 30 mm per minute. The travel path, i.e. the change in position of the coupling element or the pumping piston, is plotted on a measurement curve 68b' indicating the time-to-digital values at a return movement of the coupling element with a travel speed of a 100 mm per minute. For plausibility tests, a force curve 74 shows a force of a drive means moving the coupling element. The set value curves 72a' and 72b' show the linearization of the measurement value curves 68a', or 68b'. The non-linearities can, for example, at least partly be caused by friction of the coupling element in the pump chamber.

Figure 16:
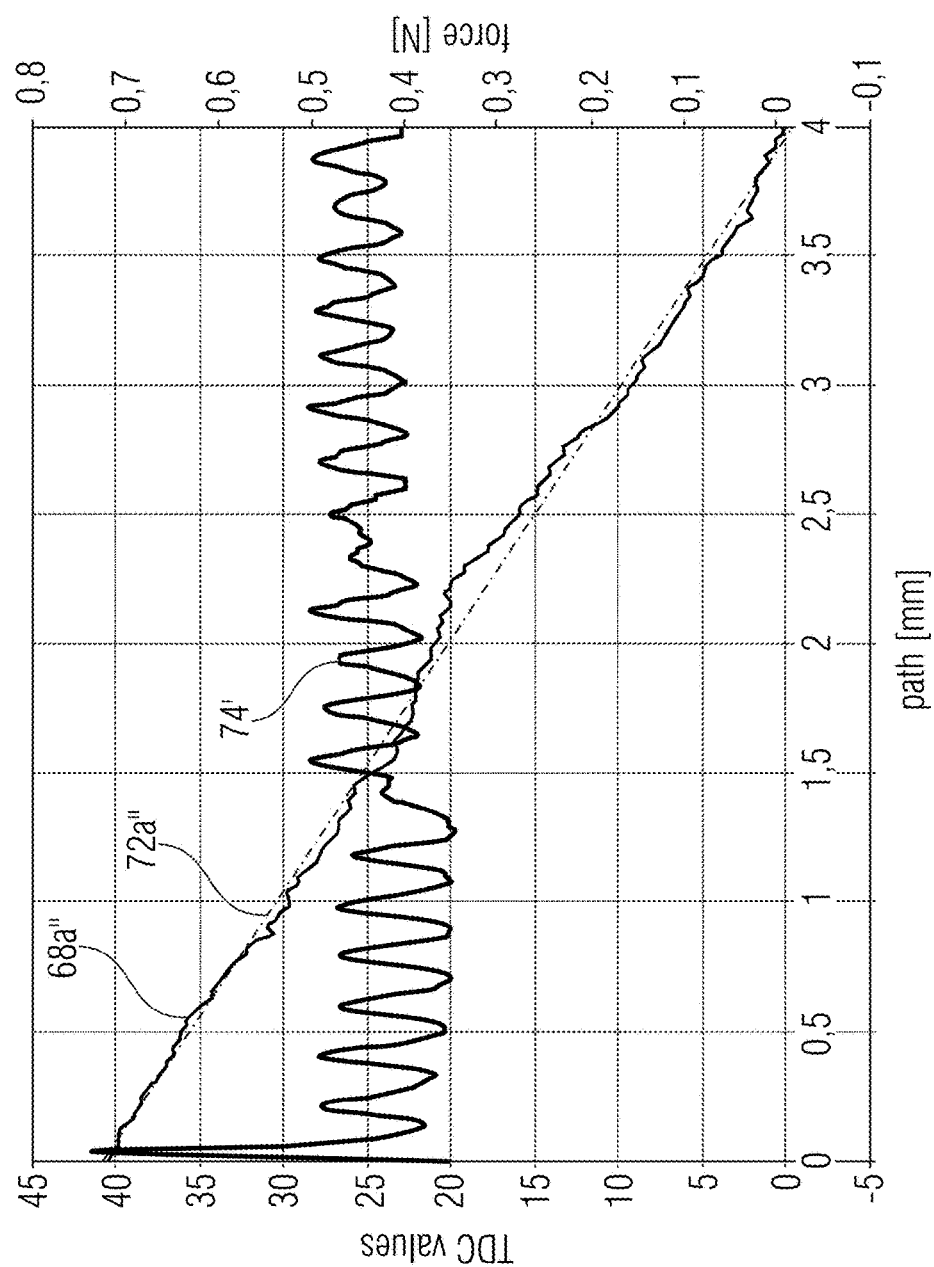
FIG. 16 shows a curve of measuring values and a corresponding set value curve which may be obtained from a measuring setup when there is a permanent magnet.

FIG. 16 shows a measurement values curve 68a" and a corresponding set value curve or straight line 72a" of a measurement setup as used, for example in FIG. 14, when a permanent magnet is present.

The deviations of the measurement values curve 68a" to the set value curve 72a" are low. A force curve 74' also shows a correlation of the friction of the coupling element in the pump chamber to the characteristic curve of the sensor. This means that the presence of a magnetic field, as generated by the permanent magnet, leaves the reliability of the measurement results unaffected.

Figure 17:
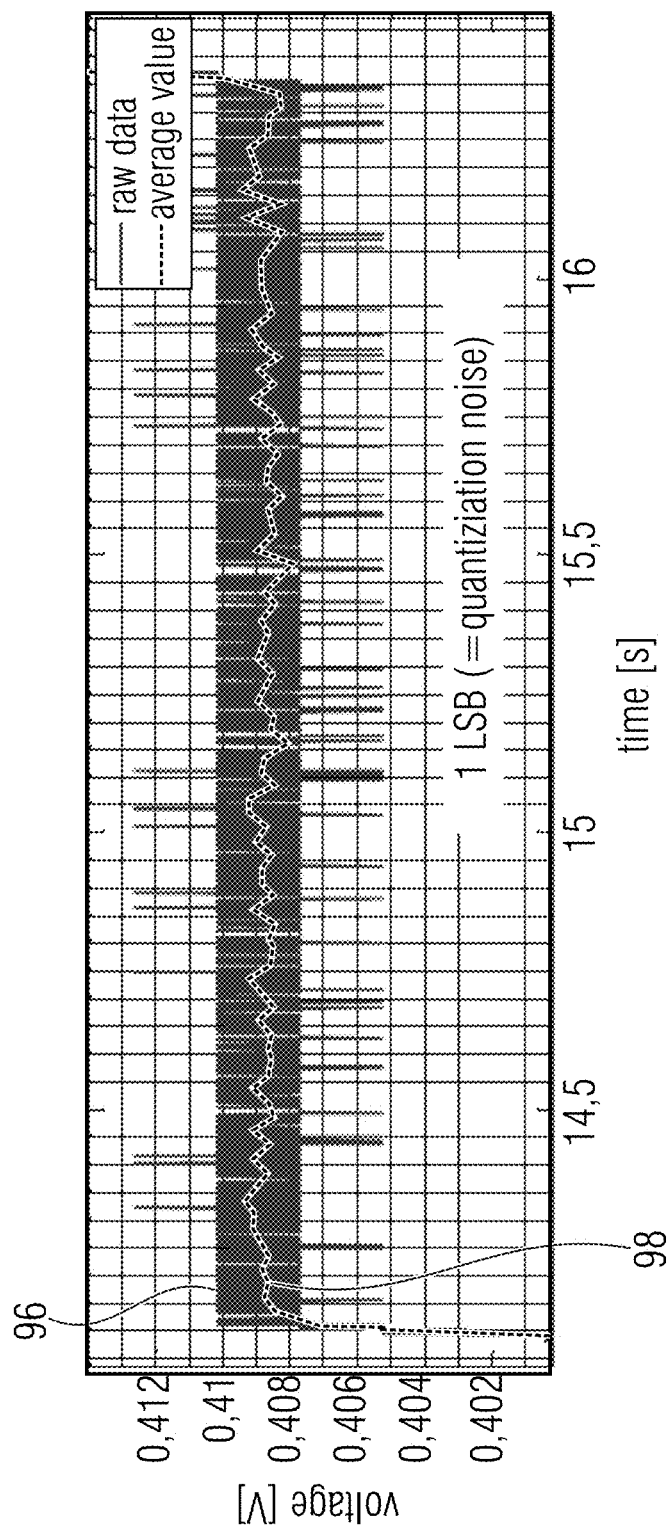
FIG. 17 shows a sensor characteristic curve including measuring values based on a noise measurement of evaluating electronics.

FIG. 17 shows a sensor characteristic curve with measurement values that can be detected based on a noise measurement of evaluating electronics as illustrated, for example, in FIG. 12. An abscissa of the graph shows a time in seconds, an ordinate of the graph shows a measured voltage in volt. A measurement curve 96 shows the detected raw data, whereas the measurement curve 98 shows a respective average value of the measurement values at an abscissa value. The detected noise is in a range of 2 mV, which can correspond to quantizing or a quantizing noise of a 12 bit AD converter when, for example, an output voltage has a dynamic of 10 volt and 12 bits are converted into 4096 discrete values having a step size of approximately 2.4 mV each. A path resolution of such an LVDT sensor can, for example, be at 2 μm, when a 12 bit AD converter is used (4 mm overall travel path at 4096 steps). The value of 2 μm relates merely to a result of an experimental setup. Basically, the path resolution can also have different values, which depends on a primary and/or secondary coil arrangement, a path to be measured, a realization of the evaluating circuit or evaluating means.

FIG. 18a shows exemplary and idealized measurement results of a classic LVDT with a signal amplitude evaluation having a full-wave rectification, in the representation of which the V-shape typical for full-wave rectification is visible. In full-wave rectification, the two secondary coils are inversely connected. In the region of the zero crossing of the coupling element, i.e. in the region of the minimum of the measurement curve 102 indicating a voltage value of the full-wave rectification, such an evaluation has a low sensitivity as well as an offset, i.e. the signal value of the measurement curve 102 is unequal 0 in the zero crossing of the coupling element. An output voltage, i.e. an ordinate value of the measurement curve 102 is ambiguous, since, starting from a zero crossing, the same can indicate a movement into a positive and a negative direction.

FIG. 18b shows a possible remedy for the ambiguity of FIG. 18a based on a measurement curve 102' as it can be obtained, for example, with a separate full-wave rectification of an amplitude evaluation.

In full-wave rectification, each secondary signal is individually demodulated at first before a difference is formed. In this way, detection of direction can be implemented; however, disadvantages remain, as they can occur, for example, by influencing the amplitude values by an external magnetic field.

Figure 18C:
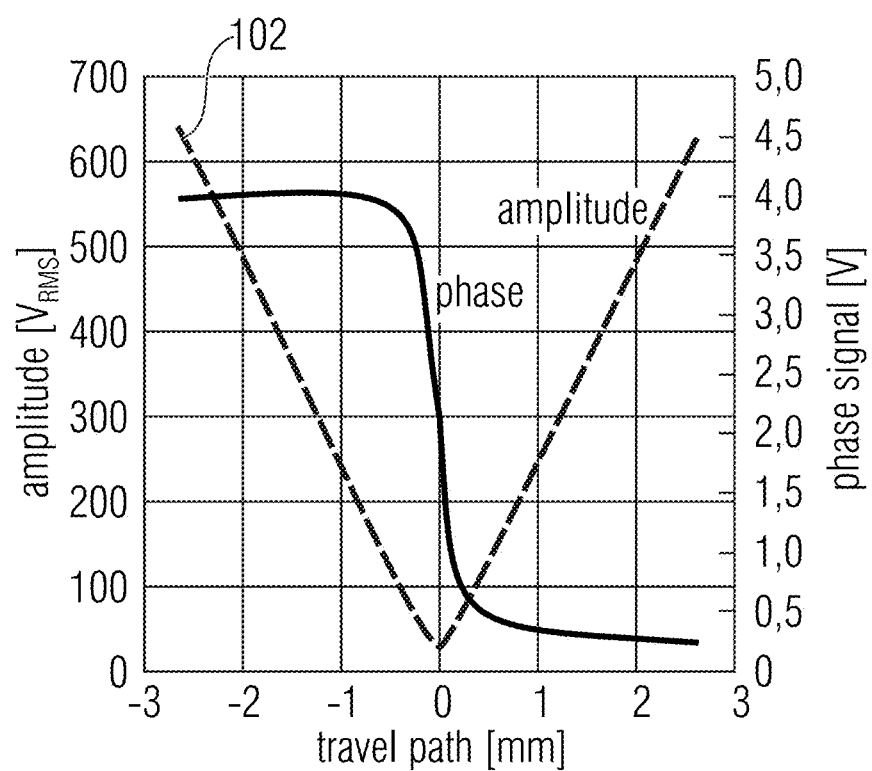
FIG. 18c shows the characteristic curve of FIG. 18a, including an additional signal of a phase comparator as a corrective measure for ambiguity.

FIG. 18c shows the measurement curve 102 of FIG. 18a and an additional evaluation of the phase by means of a phase comparator. Detection of direction can also be performed by additional phase evaluation, such that depending on a position off the zero crossing a phase value can be obtained, which indicates a position on the one or other side of the zero crossing in a linear direction of movement of the coupling element. The phase shift between the two phase values takes place in a relatively abrupt manner in a small range around the zero crossing and is approximately linear only in this relatively small range. This is also referred to as full-wave rectification with phase detector and is described, for example, in an application note designated DN362 by the Linear Technologie company.

In other words, the phase signal is here used merely as case differentiation in order to determine whether an obtained amplitude signal is to be allocated to the left or the right edge of the amplitude curve. Determination of the (possible) position takes place from the amplitude signal which provides two possible positions outside the minimum of the measurement curve 102 between which selection is made based on the phase value. Further, the measurement curve 102 can be influenced by external interference influences, such as magnetic fields, as illustrated in FIG. 13, such that based on the amplitude evaluation two erroneous possible positions can be provided for the case differentiation based on the phase value, for example when external magnetic fields influence the measurement results.

The offset of the measurement curve 102 can at least partly be explained by flow losses in the LVDT. The fact that the offset is caused by the evaluating circuit is generally opposed, such that optimizing the evaluating circuit possibly merely results in insufficient improvements.

Figure 19B:
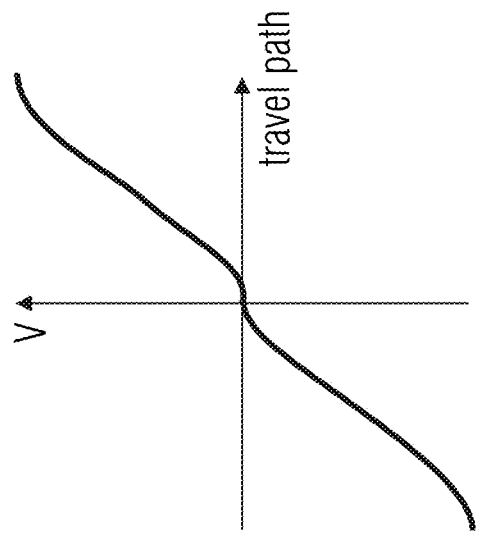
FIG. 19b shows a real, over-emphasized and non-linear output curve, as is exemplarily illustrated in the application document SPRA 946 by the Texas Instruments company.
Figure 19A:
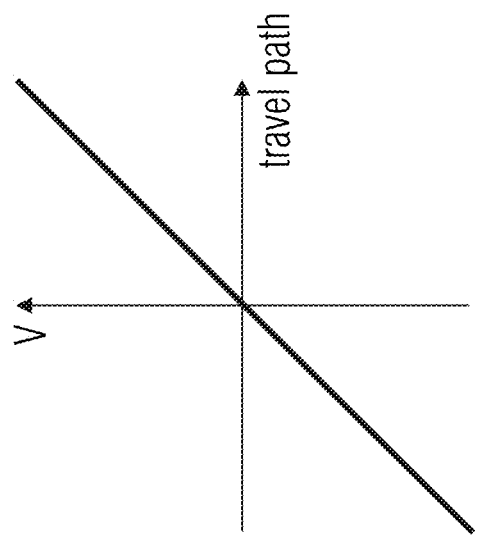
FIG. 19a shows an ideal signal/shift curve including signal values indicating a position of the coupling element based on a separate full-wave rectification.

FIGS. 19a and 19b show further characteristics of a classic signal evaluation. FIG. 19a shows an ideal, i.e. desired signal/shift curve having signal values indicating a position of the coupling element based on a separate full-wave rectification.

FIG. 19b shows a real non-linear output curve illustrated in an exaggerated manner, as it is described, for example, in the application SPRA 946 by the Texas Instruments company. In marginal areas of the characteristic curve, i.e. at minimum and/or maximum deflection, the characteristic curve shows non-linearities. Further, in the range of the zero crossing, the curve shows disadvantageous non-linearities. Reasons for attenuation close to the maximum of the core shift, i.e. the shift of the coupling element, can be caused by a design of the converter. Further, phase effects can cause the non-linearities, whereas the non-linearity close to the zero crossing is the effect of the residual signal, i.e. offset, at the zero point of the converter. In a purely analog system, both effects are difficult to very difficult to correct.

Figure 20:
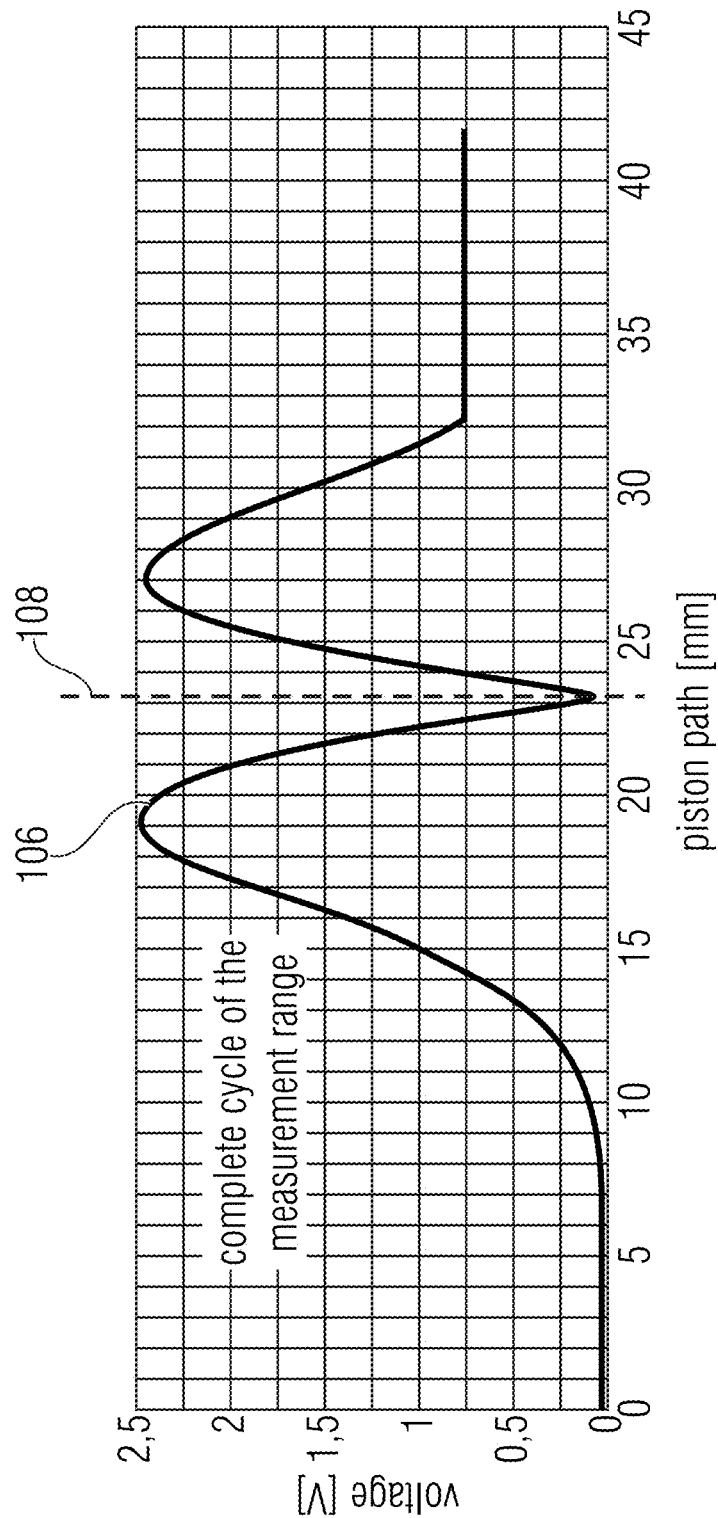
FIG. 20 is a diagram with a measuring curve in which an LVDT sensor including amplitude evaluation indicates a piston path where there is no interfering body.

FIG. 20 shows a graph having two measurement curves, wherein a LVDT sensor without presence of an interfering body, such as a ferromagnetic and/or permanent magnetic material and/or magnetic fields indicates a piston path by an amplitude evaluation. The measurement curve 106 shows both raw data and respective average values, wherein the average values are covered by the raw data. In other words, the measurement curve 106 shows a measured characteristic curve with classis signal evaluation, i.e. amplitude evaluation. An almost symmetrical output voltage can be detected when the piston is traveling from a zero position 108 into a range of a lower piston path or a higher piston path. Around the zero position 108, the measurement curve 106 shows the typical V-shape as it is shown, for example, in FIG. 18a in an idealized manner. After reaching a respective maximum of, for example, 2.5 V, the output voltage falls continuously with increasing path between zero crossing and current piston position. A curve of the output voltage at approximately 0.75 V is substantiated in the limited travel option of the piston in the underlying setup. In other words, FIG. 119 shows an overall cycle of the measurement range of the piston across the piston path.

Figure 21A:
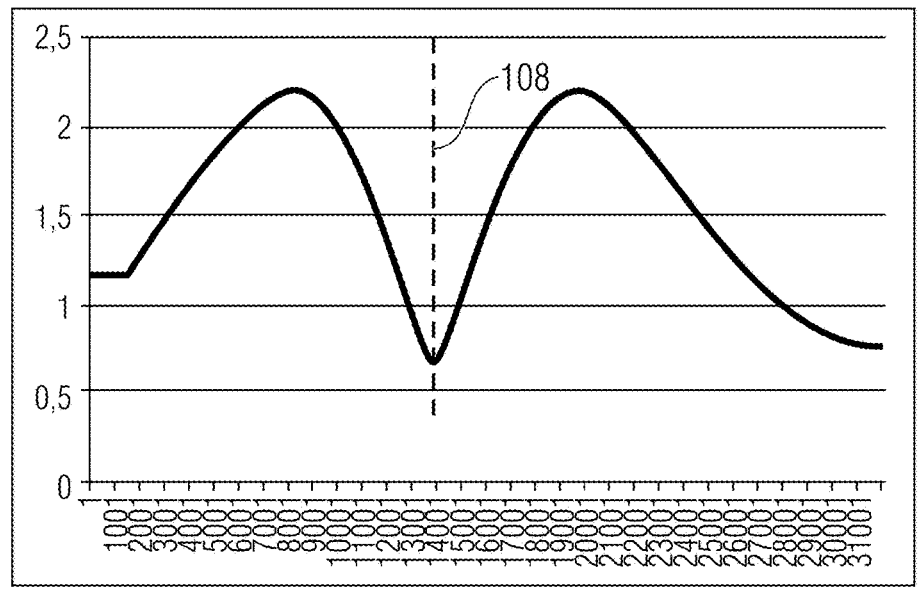
FIG. 21a shows an uninfluenced measuring curve, as is similarly illustrated exemplarily in FIG. 20, in which an interfering body has been adjusted in symmetry to the LVDT.

FIGS. 21a, 21b, 21c and 21d show qualitative influences of an overlaying magnetic field on an amplitude evaluation which has been measured by de-adjusting the interfering body causing the magnetic field, such as a permanent magnet generating a magnetic field, from the zero position. FIG. 21a shows an uninfluenced measurement curve, as it is exemplarity shown in FIG. 20 in a similar form.

Figure 21B:
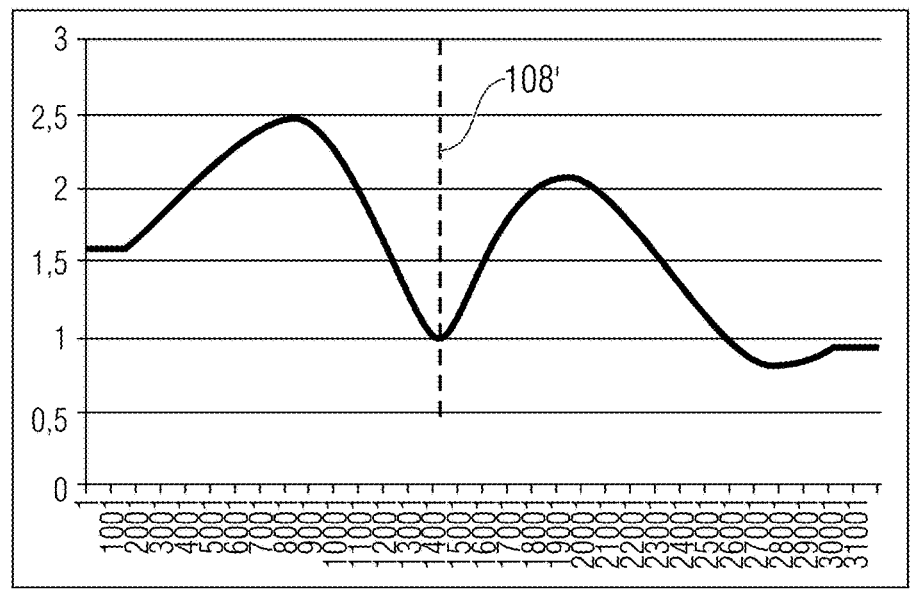
FIG. 21b shows a resulting curve of amplitude evaluation in accordance with FIG. 21a, with de-adjusting (misaligning) the interfering body by 0.1 mm.

FIG. 21b shows the resulting curve of the amplitude evaluation when the interfering body is de-adjusted by 0.1 mm. The signal amplitudes become asymmetrical on the left and right of a de-adjusted zero crossing 108', i.e. the respective local maxima have a differing amplitude.

Figure 21C:
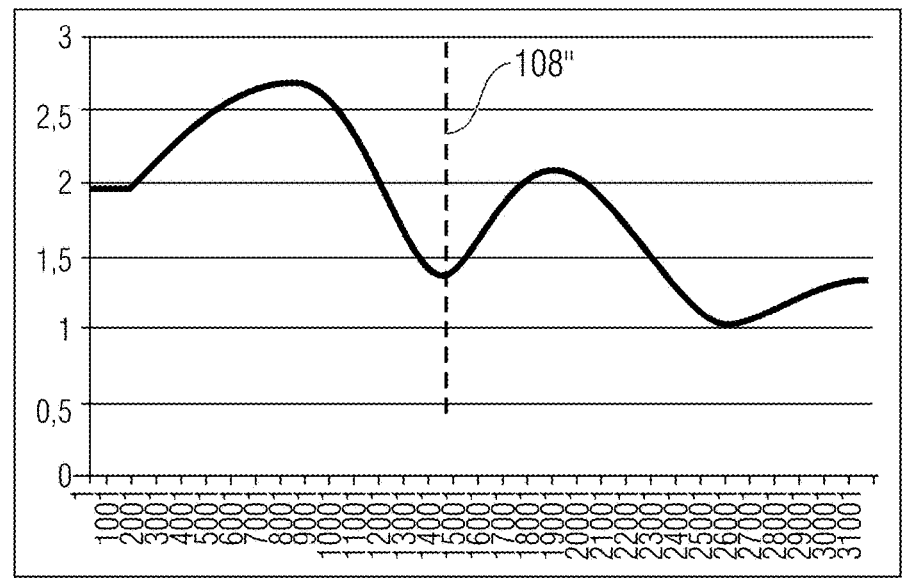

FIG. 21c shows an exemplary measurement result where the interfering body is de-adjusted by 0.2 mm with respect to FIG. 21a. With respect to FIG. 21b, the two asymmetries of the portions to the left and right of a de-adjusted zero crossing 108" are increased further.

Figure 21D:
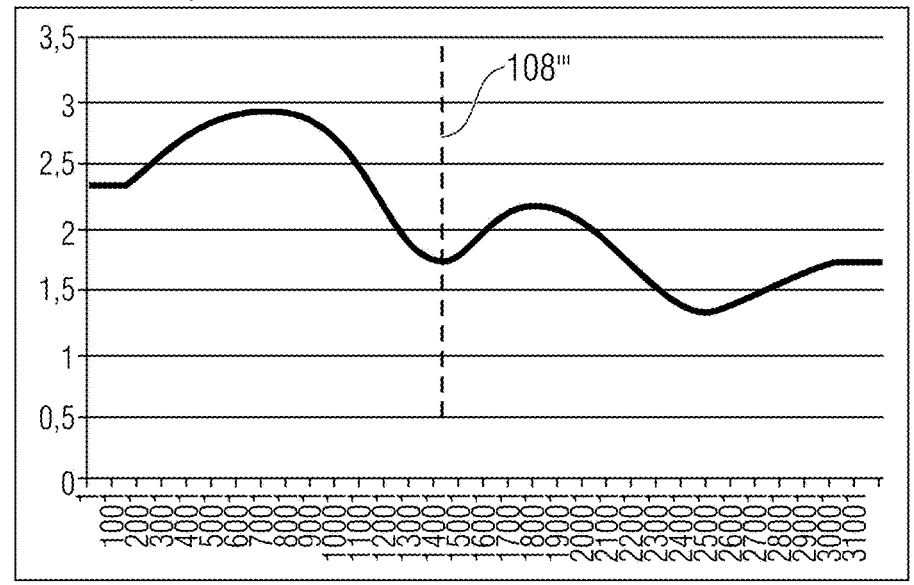

FIG. 21d shows an exemplary measurement result, where the interfering body is de-adjusted by 0.3 mm with respect to FIG. 21a, which results in a further increased asymmetry of the local maxima of the measurement results around the de-adjusted zero crossing 108".

Magnetic fields applied to a symmetrically adjusted system, i.e. the interfering body, as illustrated, for example in FIG. 22a, can result in interferences of the measurement results analogously to a de-adjustment of the interfering body as shown exemplarily in FIGS. 21b, 21c and 21d. In other words, de-adjustment of an interfering body can have the same or similar effects as interfering magnetic fields. When strong magnetic fields are present, an amplitude response can be distorted, for example by coils and/or magnets or in ferromagnetic materials, and can possibly be disadvantageous for determining the position of the coupling element or may make the measurement unusable.

While the primary coil and the secondary coils have been illustrated as planar coils arranged on a substrate in the above embodiments, the primary and/or secondary coils or one secondary coil can be implemented in any coil shape, such as an air coil, winding coil with and without a ferrite core or, for example, a choke such as a ring core choke, a rod core choke, an air core choke.

While some aspects have been described in the context of a device, it is obvious that these aspects also represent the description of the respective method, such that a block or a member of a device can also be considered as a respective method step or feature of a method step. Analogously, aspects that have been described in the context of one or as a method step also represent a description of a respective block or detail or feature of a respective device.

Depending on specific implementation requirements, embodiments of the invention can be implemented in hardware or in software. The implementation can be performed by using a digital memory medium, such as floppy disk, DVD, Blu-Ray disc, CD, ROM, PROM, EPROM, EEPROM or flash memory, hard drive or any magnetic or optical memory on which electronic readable control signals are stored that can cooperate or cooperate with a programmable computer system such that the respective method is performed. Thus, the digital memory medium can be computer-readable. Some embodiments according to the invention comprise a data carrier comprising electronically readable control signals that are able to cooperate with the programmable computer system such that one of the methods described herein is performed.

Generally, embodiments of the present invention can be implemented as computer program product with a program code, wherein the program code is effective to perform one of the methods when the computer program product runs on a computer. The program code can also be stored, for example, on a machine-readable carrier.

Other embodiments comprise the computer program for performing one of the methods described herein, wherein the computer program is stored on a machine-readable carrier.

In other words, an embodiment of the inventive method is a computer program comprising a program code for performing one of the methods described herein, when the computer program runs on a computer. Thus, a further embodiment of the inventive method is a data carrier (or a digital memory medium or a computer-readable medium) on which the computer program for performing one of the methods described herein is recorded.

Thus, a further embodiment of the inventive method is a data stream or a sequence of signals representing the computer program for performing one of the methods described herein. The data stream or the sequence of signals can be configured such that the same can be transferred via a data communication connection, for example via the Internet.

A further embodiment comprises a processing means, for example a computer or programmable logic device that are configured or adapted to perform one of the methods described herein.

A further embodiment comprises a computer on which the computer program for performing one of the methods described herein is installed.

In some embodiments, a programmable logic device (for example, a field programmable gate array, a FPGA) can be used to perform some or all functionalities of the methods described herein. In some embodiments, a field programmable gate array can cooperate with a microprocessor to perform one of the methods described herein. Generally, in some embodiments, the methods are performed by means of any hardware device. The same can be a universally usable hardware, such as a computer processor (CPU), or method-specific hardware, such as an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A sensor comprising:
   a primary coil;
   two secondary coils;

wherein an excitation signal may be applied to the primary coil and an output signal depending on a position of a coupling element may be induced in each secondary coil; and an evaluator for evaluating the output signals of the secondary coils, wherein the evaluator is configured to evaluate a phase offset between the output signals, and to provide a sensor output signal proportional to the phase offset indicating the position or a change in position of the coupling element, wherein the evaluator is configured to provide, at a first phase offset, a first sensor output signal representing a first position or change in position of the coupling element;

wherein the evaluator is configured to provide, at a second phase offset, a second sensor output signal representing a second position or change in position of the coupling element;

wherein the evaluator is configured to provide, at a third phase offset, a third sensor output signal representing a third position or change in position of the coupling element;

wherein in the case of a directly proportional sensor output signal, the third phase offset is greater than the second phase offset, and the third position or change in position is greater than the second position or change in position, and the second phase offset is greater than the first phase offset, and the second position or change in position is greater than the first position or change in position; or wherein in the case of an indirectly proportional sensor output signal, the third phase offset is greater than the second phase offset, and the third position or change in position is smaller than the second position or change in position and the second phase offset is greater than the first phase offset, and the second position or change in position is smaller than the first position or change in position.

2. The sensor according to claim 1,
wherein the first phase offset is offset by more than 25% of an overall measurement range from a center position of the overall measurement range to smaller phase shifts; or
wherein the third phase offset is offset by more than 25% of an overall measurement range from a center position of the overall measurement range to greater phase shifts.

3. The sensor according to claim 2, wherein the overall measurement range is at least equal to a width of one of the secondary coils in the direction of a predetermined direction of movement of the coupling element or equal to a shortest distance between the two secondary coils.

4. The sensor according to claim 1, wherein the evaluator is implemented to acquire the output signal of the first secondary coil at a frequency that is equal to the frequency of the excitation signal, and the output signal of the second secondary coil at a frequency that is equal to the frequency of the excitation signal;
to process the first output signal and the second output signal such that based on a time offset between a feature of the first output signal and a feature of the second output signal the sensor output signal is determined.

5. The sensor according to claim 1, wherein the evaluator is further configured to determine a time offset between at least one output signal of one of the secondary coils and the excitation signal to provide an offset correction value.

6. The sensor according to claim 1, wherein the evaluator further comprises a time-to-digital converter that is configured to acquire the output signal of the first secondary coil at a frequency that is equal to the frequency of the excitation signal, and the output signal of the second secondary coil at a frequency that is equal to the frequency of the excitation signal; to measure a time offset between an occurrence of a feature in the two output signals, and to output a digital value indicating the measured time, wherein the measured time correlates with the phase offset.

7. The sensor according to claim 1, wherein the evaluator further comprises a phase detector and a quotient determiner,
wherein the phase detector is configured to acquire the output signal of the first secondary coil at a frequency that is equal to the frequency of the excitation signal, and the output signal of the second secondary coil at a frequency that is equal to the frequency of the excitation signal, and to determine the time offset based on a multiplication process of the two output signals; and
wherein the quotient determiner is configured to determine a quotient between the output signal of the first secondary coil and the output signal of the second secondary coil to provide an amplitude ratio signal.

8. The sensor according to claim 1, wherein the evaluator further comprises a signal transducer and a multiplier;
wherein the signal transducer is configured to acquire the output signal of the first secondary coil at a frequency that is equal to the frequency of the excitation signal, and the output signal of the second secondary coil at a frequency that is equal to the frequency of the excitation signal, and to emphasize a feature of the output signal of the first secondary coil and a feature of the output signal of the second secondary coil, and to provide a first transduced signal with the emphasized feature of the output signal of the first secondary coil and a second transduced signal with the emphasized feature of the output signal of the second secondary coil; and
wherein the multiplier is configured to provide a multiplication signal based on a multiplication of the first transduced signal and the second converted signal such that a direct component of the multiplication signal indicates the time offset.

9. The sensor according to claim 1, wherein the evaluator is configured to determine a phase of the first output signal and a phase of the second output signal and to determine the phase offset based on a difference between the phases.

10. The sensor according to claim 1, comprising
a substrate;
wherein the two secondary coils and the primary coil are arranged on the substrate;
wherein the secondary coils and the primary coils are planar coils; and
wherein terminals for the secondary coils and the primary coil are also arranged on the substrate.

11. The sensor according to claim 10, wherein the primary coil is arranged with respect to the two secondary coils such that turns of the primary coil enclose turns of the secondary coils.

12. The sensor according to claim 10,
wherein the substrate is a flexible substrate and wherein the flexible substrate is formed into a three-dimensional arrangement, wherein a surface of the three-dimensional arrangement comprising the two secondary coils and at least one part of the primary coil is not planar and adapted to a non-planar surface of the coupling element.

13. The sensor according to claim 1, wherein the coupling element comprises a metallic or ferromagnetic material.

14. The sensor according to claim 1, wherein the primary coil comprises an inductance of equal to or less than 500 mH or a secondary coil comprises an inductance of equal to or less than 500 mH.

15. The sensor according to claim 1, wherein one side of a first secondary coil and one side of a second secondary coil are connected to the same electric potential.

16. A device comprising a sensor according to claim 1 and further comprising a movable element connected to the coupling element such that a position of the coupling element is influenced by a position of the movable element.

17. A flexible circuit for a sensor, comprising:
a substrate;
a primary coil comprising primary coil leads;
two secondary coils comprising secondary coil leads;
wherein the primary coil and the two secondary coils are planar coils on the substrate;
wherein the two secondary coils are arranged next to each other;
wherein the primary coil is arranged with respect to the two secondary coils such that turns of the primary coil enclose turns of the secondary coils;
wherein the primary coil leads and the secondary coils leads are arranged on an elongate substrate part, wherein the elongate substrate part is integrally implemented with a coil substrate part on which the two secondary coils and the primary coil are arranged.

18. A method for operating a sensor comprising a primary coil, two secondary coils and a coupling element, comprising:

applying an excitation signal to the primary coil and inducing an output signal depending on a position of the coupling element in each secondary coil; and evaluating the output signals of the secondary coils based on a phase offset between the output signals, and providing a sensor output signal indicating the position or a change in position of the coupling element;

providing, at a first phase offset, a first sensor output signal representing a first position or change in position of the coupling element;

providing, at a second phase offset, a second sensor output signal representing a second position or change in position of the coupling element;

providing, at a third phase offset, a third sensor output signal representing a third position or change in position of the coupling element;

such that in the case of a directly proportional sensor output signal, the third phase offset is greater than the second phase offset, and the third position or change in position is greater than the second position or change in position, and the second phase offset is greater than the first phase offset, and the second position or change in position is greater than the first position or change in position; or such that in the case of an indirectly proportional sensor output signal, the third phase offset is greater than the second phase offset, and the third position or change in position is smaller than the second position or change in position and the second phase offset is greater than the first phase offset, and the second position or change in position is smaller than the first position or change in position.

19. A computer program comprising a program code for performing a method according to claim 18 when the program runs on a computer.

* * * * *